United States Patent [19]
Yamazaki

[11] Patent Number: 5,657,034
[45] Date of Patent: Aug. 12, 1997

[54] DISPLAY APPARATUS AND METHOD FOR DISPLAYING SIGNALS OF DIFFERENT ASPECT RATIOS LEFT AND RIGHT VIEWING

[75] Inventor: Yasuyuki Yamazaki, Matsudo, Japan

[73] Assignee: Canon Kabushiki Kaisha, Tokyo, Japan

[21] Appl. No.: 358,870

[22] Filed: Dec. 19, 1994

[30] Foreign Application Priority Data

| Dec. 22, 1993 | [JP] | Japan | 5-345475 |
| Apr. 27, 1994 | [JP] | Japan | 6-089882 |
| Dec. 9, 1994 | [JP] | Japan | 6-330957 |

[51] Int. Cl.$^6$ ............................................. G09G 5/18
[52] U.S. Cl. ........................ 345/8; 345/132; 348/556
[58] Field of Search ............................. 345/7–9, 903, 345/132; 348/36, 38, 556

[56] References Cited

U.S. PATENT DOCUMENTS 5,034,809 7/1991 Katoh .
5,365,276 11/1994 Imai et al. .................... 348/556

FOREIGN PATENT DOCUMENTS

| 0563737 | 10/1993 | European Pat. Off. | H04N 13/02 |
| 0617549 | 9/1994 | European Pat. Off. | H04N 3/08 |
| 8401680 | 4/1984 | WIPO | H04N 5/64 |

Primary Examiner—Jeffery Brier
Attorney, Agent, or Firm—Fitzpatrick, Cella, Harper & Scinto

[57] ABSTRACT

Two liquid crystal panels for a first aspect ratio of, e.g., the conventional NTSC or PAL system are used to display an image having the first aspect ratio and an image having a second aspect ratio larger than the first aspect ratio by efficiently using the screens of the panels. For this purpose, right- and left-side liquid crystal panels (16R, 16L) for the first aspect ratio, for displaying images formed by an image signal at positions visible to only right and left eyes, respectively, and driving units (7–15, 17–19) for displaying identical images on the left and right liquid crystal panels when an image is to be displayed at the first aspect ratio, and divisionally displaying the image formed by the image signal on the left and right liquid crystal panels when the image is to be displayed at the second aspect ratio are provided.

31 Claims, 30 Drawing Sheets

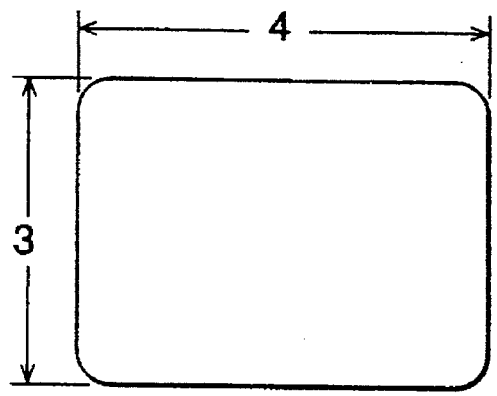
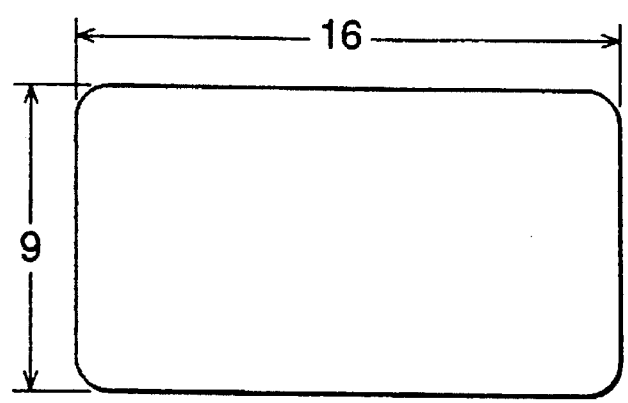
FIG.1A    FIG.1B
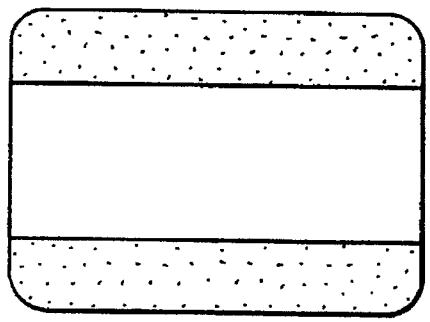
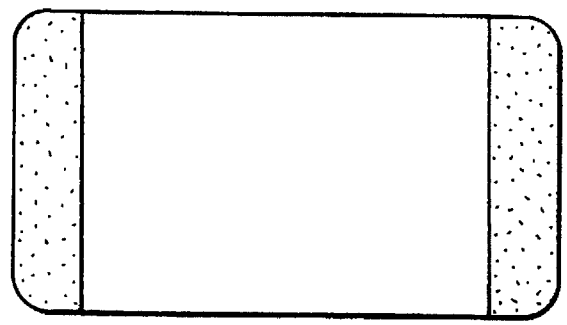
FIG.1C    FIG.1D

DISPLAY APPARATUS AND METHOD FOR DISPLAYING SIGNALS OF DIFFERENT ASPECT RATIOS LEFT AND RIGHT VIEWING

BACKGROUND OF THE INVENTION

1. Field of the Invention

The present invention relates to a display apparatus and method and, more particularly, to a display apparatus and method in which two image display means (e.g., liquid crystal panels) having a desired aspect ratio are used to display a plurality of types of images having different aspect ratios in the entire display regions of the image display means.

2. Related Background Art

Conventionally, an image of the NTSC or PAL system has an aspect ratio of 4:3. The screen of a display apparatus also has an aspect ratio of 4:3, as shown in FIG. 1A. In recent years, however, the HDTV (High-Definition TeleVision) system has been put into practice, and HDTV display apparatuses have been widespread. The screen of an HDTV display apparatus has an aspect ratio of 16:9, as shown in FIG. 1B. Along with this tendency, the aspect ratio of a display apparatus other than the HDTV display apparatus also becomes 16:9 to enhance extensity.

However, the HDTV display apparatus is still expensive. Additionally, the conventional display apparatus has a fixed aspect ratio. For this reason, when an HDTV image is to be displayed on the conventional display apparatus having an aspect ratio of 4:3, the image is displayed in only part of the screen because of a difference in aspect ratio, as shown in FIG. 1C, resulting in unnatural display.

To the contrary, when an image having an aspect of 4:3 is displayed on the display apparatus having an aspect ratio of 16:9, portions where no image is displayed are formed on the left and right sides of the screen, as shown in FIG. 1D. The image is displayed in only part of the screen, resulting in unnatural display.

Additionally, since only part of the screen is used for display, the image quality such as the resolution and sharpness of the displayed image is also sometimes adversely affected.

It is, of course, possible to use the entire screen for display. In this case, however, the to-be-displayed image is partially excluded from the screen, and the display content cannot be displayed, posing a problem except for special applications.

SUMMARY OF THE INVENTION

The present invention has been made to solve the above problems, and has as its object to provide a display apparatus and method in which a display means having a predetermined aspect ratio is used to display image information having an arbitrary aspect ratio without forming any non-display portion.

It is another object of the present invention to provide a display apparatus and method in which a display means for displaying an image having a small aspect ratio as of the NTSC or PAL system is used to display an image on the entire screen independently of the aspect ratio.

It is still another object of the present invention to provide a display apparatus and method in which images having different aspect ratios can be excellently displayed independently of the aspect ratios without degrading the image quality including image reproducibility, e.g., resolution and sharpness inherent to the display means.

The present invention has as its object to provide a display apparatus comprising:

an image signal input terminal for receiving an image signal;

discriminating means for determining whether the input image signal is a signal of a first system for displaying an image at a first aspect ratio or a signal of a second system for displaying the image at a second aspect ratio larger than the first aspect ratio;

first display means for the first aspect ratio, for displaying the image according to the input image signal at a position visible to only a right eye;

second display means for the first aspect ratio, for displaying the image according to the input image signal at a position visible to only a left eye; and driving means for displaying identical images formed by the input image signal on the first and second display means when the discriminating means discriminates the input image signal as the signal of the first system, and divisionally displaying the image formed by the input image signal on the left and right display means when the discriminating means discriminates that the input signal is the signal of the second system.

The present invention also has as its object to provide a display apparatus comprising:

first display means for displaying image information at a position visible to only a right eye;

second display means for displaying the image information at a position visible to only a left eye;

operating means for setting an aspect ratio for display of the image information; and aspect ratio converting means for converting the aspect ratio of the input image information into the aspect ratio set by the operating means and divisionally supplying the image information having the converted aspect ratio to the first and second display means.

The present invention also has as its object to provide a display method in which an image signal is input to display means having a first aspect ratio and visible to only a right eye and display means having the first aspect ratio and visible to only a left eye, wherein an image signal having a second aspect ratio different from the first aspect ratio is divisionally displayed on the first and second display means.

BRIEF DESCRIPTION OF THE DRAWINGS

FIGS. 1A to 1D are schematic views for explaining the display method of a conventional display apparatus;

DETAILED DESCRIPTION OF THE PREFERRED EMBODIMENTS

In the present invention, two display means each having a display unit with an aspect ratio of, e.g., 4:3 are respectively provided for right and left eyes. When an image having an aspect ratio of 4:3 is to be displayed on the display means of the display apparatus, the image is displayed on both the display units of the display means. Assume that an image having an aspect ratio of 16:9 is to be displayed. On the right-eye display unit of the display means, an image having a vertical length corresponding to the entire vertical length of the display unit is displayed from the right side of the image. On the left-eye display unit of the display means, an image having a vertical length corresponding to the entire vertical length of the display unit is displayed from the left side of the image.

With this display method, when the aspect ratio is 4:3, an observer receives identical images from both the left and right display units. When the aspect ratio is 16:9, the left and right eyes of the observer receive different images except for part of the image region.

Not only when the left and right eyes receive the identical images but also when the left and right eyes receive identical or almost identical images displayed at the central portion, the observer can recognize these images as one image even if the images are partially different from each other (the left-side image on the left-eye display unit is different from the right-side image on the right-eye display unit). The present invention has been made on the basis of this finding by the present inventor.

The present invention will be described below in detail with reference to the accompanying drawings.

First Embodiment

Figure 2:
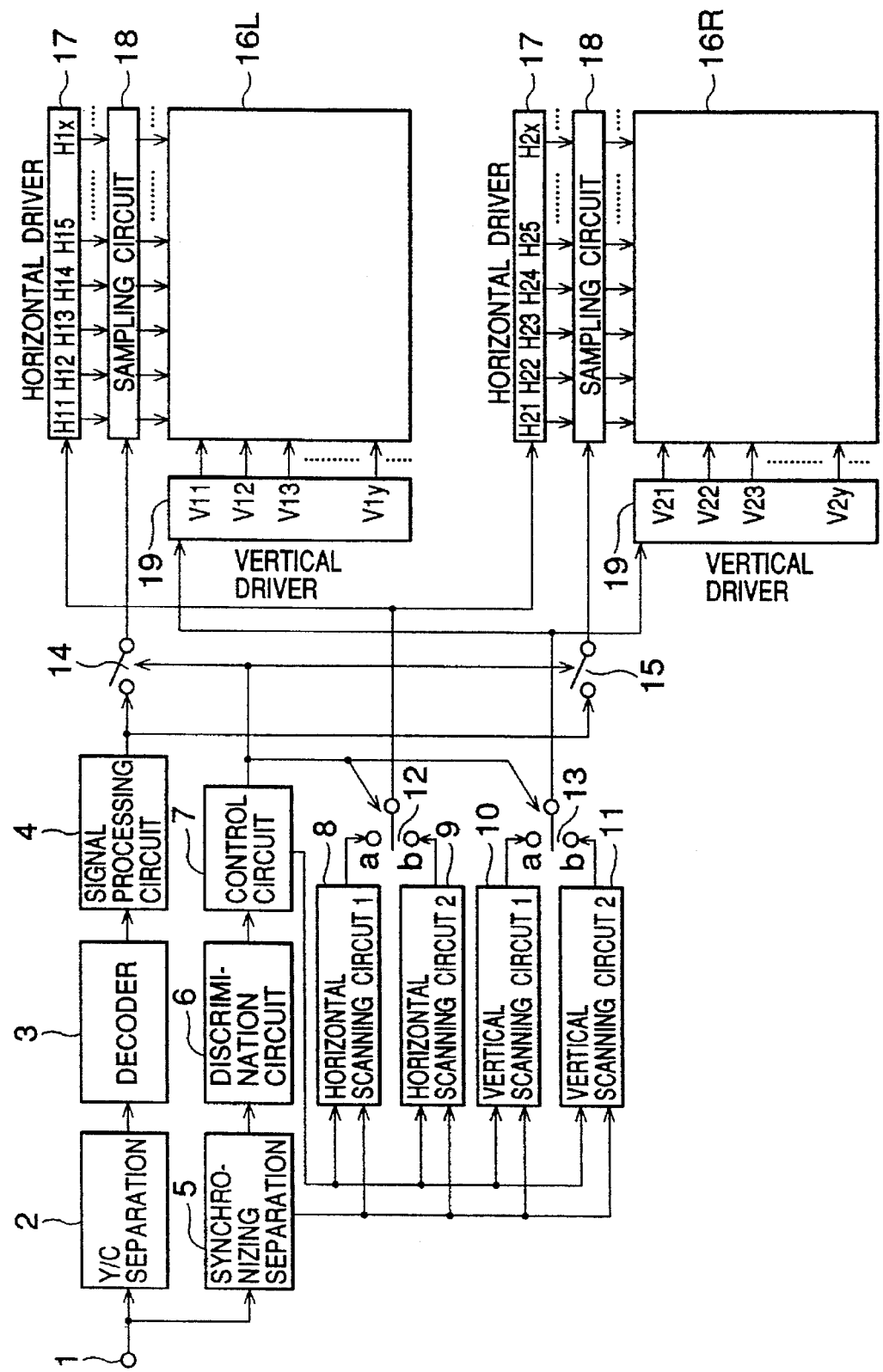
FIGS. 2, 7, 10, 11, 15, 16, 22, and 27 are block diagrams schematically showing liquid crystal display apparatuses so as to explain the embodiments of the present invention, respectively.

FIG. 2 is a block diagram schematically showing a liquid crystal display apparatus according to the first preferred embodiment of the present invention. Referring to FIG. 2, the liquid crystal display apparatus includes an input terminal 1 for receiving an image (VIDEO) signal, a Y/C separation circuit 2 for separating the image signal into a luminance signal (Y signal) and chrominance signals (C signals), a decoder 3 for generating primary color signals of R (red), G (green), and B (blue) from the Y and C signals, a signal processing circuit 4 such as an AGC circuit or a γ-correction circuit for liquid crystal panels, a synchronizing separation circuit 5 for separating a synchronizing signal from the image signal, a discrimination circuit 6 for discriminating the system of the input image signal, a control circuit 7 for controlling a method of scanning the liquid crystal panels in accordance with the discrimination result from the discrimination circuit 6, horizontal scanning circuits 8 and 9 for generating a horizontal scanning pulse for the liquid crystal panels, vertical scanning circuits 10 and 11 for generating a vertical scanning pulse for the liquid crustal panels, and switching circuit 12 to 15. A liquid crystal panel 16R is arranged at a position visible to only a right eye, and a liquid crystal panel 16L is arranged at a position visible to only a left eye. A horizontal driver 17 converts the horizontal scanning pulse into a voltage for driving the liquid crystal panels. Sampling circuits 18 sample the input image signal in units of pixels in the horizontal direction so as to display the image signal on the liquid crystal panels. A vertical driver 19 converts the vertical scanning pulse into a voltage for driving the liquid crystal panels.

Figure 3:
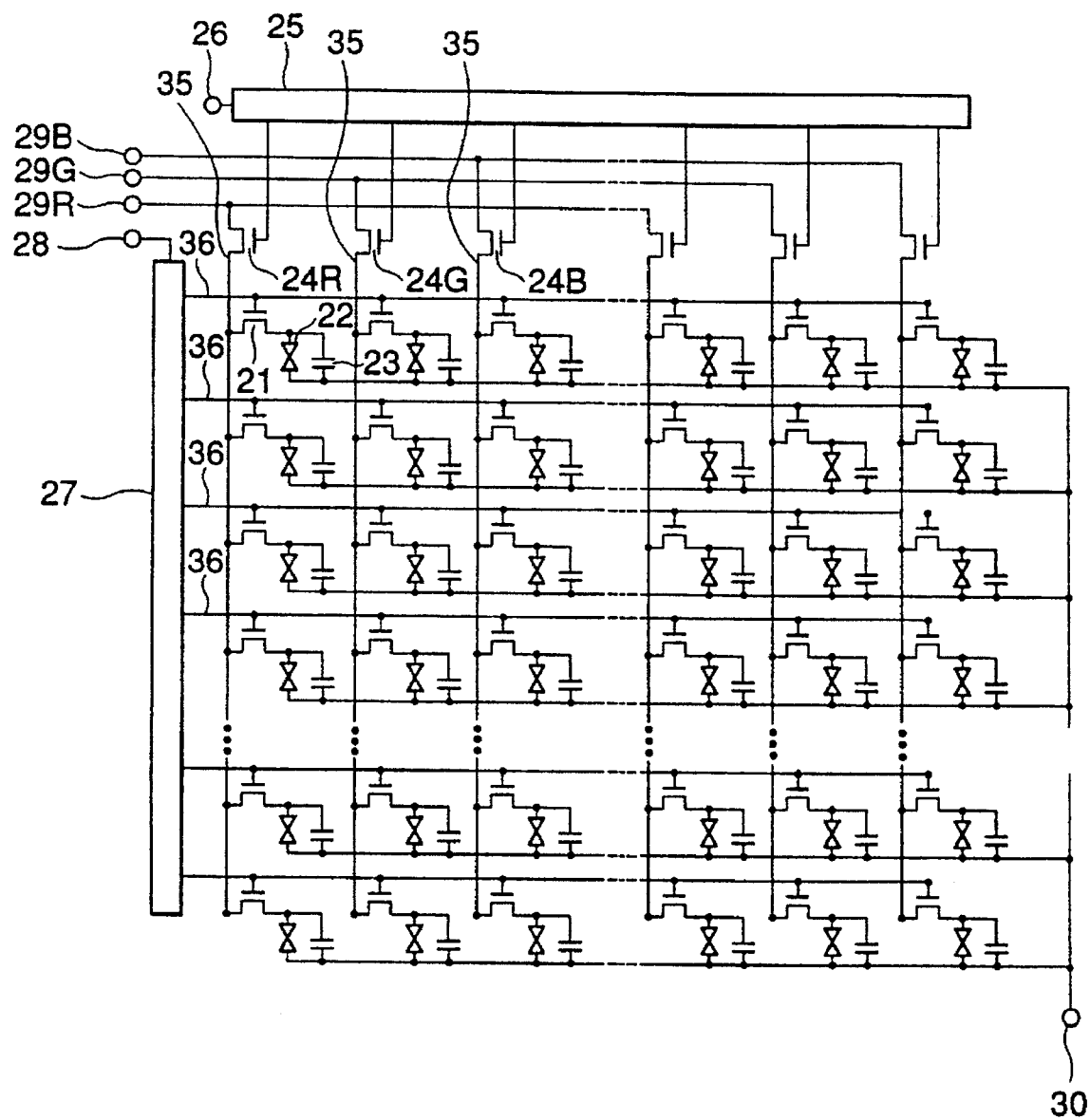
FIGS. 3 and 8 are schematic circuit diagrams for explaining liquid crystal panels used in the present invention, respectively.

FIG. 3 is a circuit diagram showing the structure of a preferred example of the liquid crystal panel used as the liquid crystal panel 16R or 16L, which uses a liquid crystal in an X-Y matrix structure. Referring to FIG. 3, the liquid crystal panel includes switching elements 21 such as FETs (TFTs), liquid crystal cells 22, holding capacitors 23 for holding signal charges, switching elements 24R, 24G, and 24B such as FETs (TFTs), a horizontal driver 25, an input terminal 26 for receiving a horizontal scanning pulse, a vertical driver 27, an input terminal 28 for receiving a vertical scanning pulse, input terminals 29R, 29G, and 29B for receiving image signal components of primary colors (R, G, and B), a common electrode 30 of the liquid crystal cells, vertical signal lines 35, and gate lines 36.

An operation of the liquid crystal panel in FIG. 3 will be described. Referring to FIG. 3, when a horizontal scanning pulse is input from the input terminal 26, the scanning pulse is converted into a predetermined voltage by the horizontal driver 25 and supplied to the gates of the switching elements 24R, 24G, and 24B, thereby sequentially turning the switches on in the horizontal direction. Image signal components input from the input terminals 29R, 29G, and 29B are sampled and supplied to the vertical signal lines 35 in FIG. 3. One end of each switching element 21 is connected to the vertical signal line 35, and the other end of each switching element 21 is connected to the corresponding liquid crystal cell 22 and the corresponding holding capacitor 23. When a vertical scanning pulse is input from the input terminal 28, the scanning pulse is converted into a predetermined voltage by the vertical driver 27 and supplied to the gates of the switching elements 21 through the predetermined vertical gate lines 36, thereby sequentially turning the switches 21 on in the vertical direction. With this operation, a charge corresponding to a potential difference between the signal supplied to an input terminal 29 (29R, 29G, or 29B) and the common electrode 30 is held in the liquid crystal cells 22 and the holding capacitors 23. At this time, a predetermined voltage is applied to the common electrode 30. By repeating this operation, an image corresponding to one frame can be displayed on the liquid crystal display apparatus in FIG. 3.

FIGS. 4A to 5B are timing charts showing driving pulses in the liquid crystal display apparatus in FIG. 2.

The operation of the liquid crystal display apparatus in FIG. 2 will be described below with reference to FIGS. 2 to 5B. An image signal input from the input terminal 1 in FIG. 2 is separated into a Y signal and C signals by the Y/C separation circuit 2. The Y and C signals are converted into primary color signals of R, G, and B by the decoder 3. Processing such as AGC (automatic gain control) or γ-correction is performed by the signal processing circuit 4. At the same time, a synchronizing signal is separated from the image signal input from the input terminal 1 by the synchronizing separation circuit 5 and input to the discrimination circuit 6. It is determined whether the image signal is a signal of the NTSC or PAL system having an aspect ratio of 4:3 or a signal of the HDTV system having an aspect ratio of 16:9 (the system having an aspect ratio of 4:3 is represented by the NTSC system in the following description). The control circuit 7 controls the switches 12 to 15 on the basis of the result obtained upon discrimination of the system of the image signal by the discrimination circuit 6.

Figure 4A:
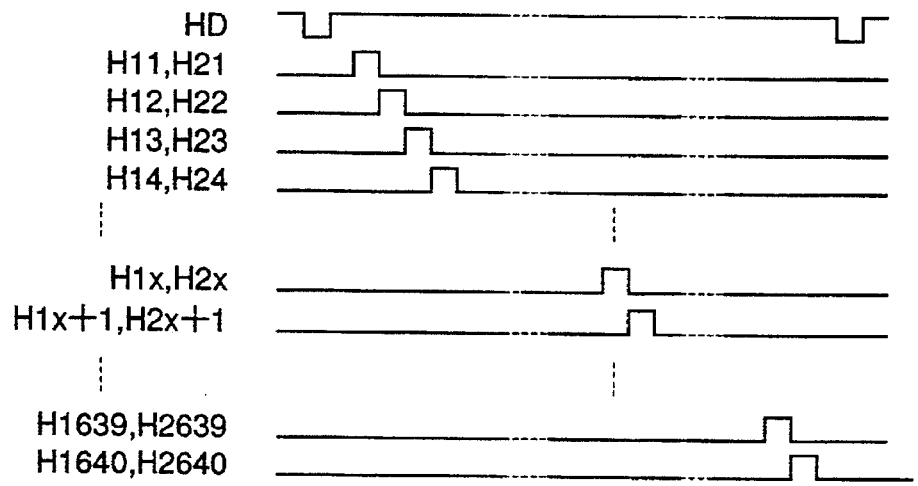
FIGS. 4A, 4B, 9A, 9B, 12A, and 12B are timing charts for explaining driving of the liquid crystal panel upon reception of, e.g., an NTSC signal.
Figure 4B:
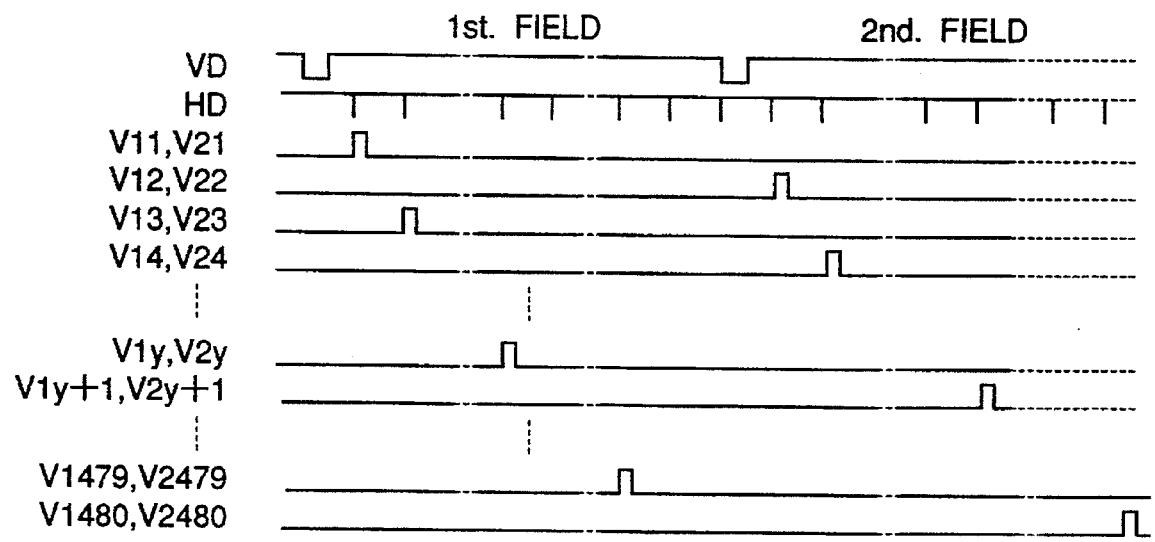

An operation for an NTSC signal and an operation for an HDTV signal will be independently described below. The liquid crystal panel used in this embodiment is assumed to have 640 pixels in the horizontal direction and 480 pixels in the vertical direction. If the discrimination circuit 6 discriminates the image signal as an NTSC signal, the control circuit 7 turns the switching circuits 14 and 15 on to simultaneously supply the image signal to both the liquid crystal panels 16R and 16L. The control circuit 7 connects the switching circuits 12 and 13 to terminals a to supply outputs from the horizontal and vertical scanning circuits 8 and 10 to the liquid crystal panels 16R and 16L. FIG. 4A is a timing chart of scanning pulses output from the horizontal scanning circuit 8. H1x represents a horizontal scanning pulse for driving the liquid crystal panel 16R, and H2x represents a horizontal scanning pulse for driving the liquid crystal panel 16L. These horizontal scanning pulses are supplied to the gates of the switching elements 24R, 24G, and 24B in an order of H11, H12, and H13, thereby scanning the liquid crystal panel in the horizontal direction. FIG. 4B is a timing chart of scanning pulses output from the vertical scanning circuit 10. V1y represents a scanning pulse for driving the liquid crystal panel 16R, and V2y represents a scanning pulse for driving the liquid crystal panel 16L. These scanning pulses are sequentially supplied to the horizontal gate lines 36 downward in an order of V11, V12, and V13, thereby scanning the liquid crystal panel in the vertical direction.

When the horizontal scanning pulses as shown in FIG. 4A are supplied to the liquid crystal panels 16R and 16L, the image signal is sampled at the timings of the scanning pulses during one horizontal scanning interval (1H) and sequentially supplied to the vertical signal lines 35 of the liquid crystal panels. Assume that the effective horizontal scanning interval of an NTSC signal is 52 µs. At this time, the frequency of the horizontal scanning pulses is represented as follows:

$$1/52 \ \mu s/640 = 12.3 \ MHz$$

When the vertical scanning pulses as shown in FIG. 4B are supplied to the liquid crystal panels 16R and 16L, odd-numbered lines of the liquid crystal panels 16R and 16L are scanned in the 1st field, and even-numbered lines are scanned in the 2nd field. That is, so-called interlaced scanning is performed. With this operation, when the image signal is an NTSC signal, identical image signals are displayed on both the liquid crystal panels 16R and 16L by interlaced scanning.

Figure 5A:
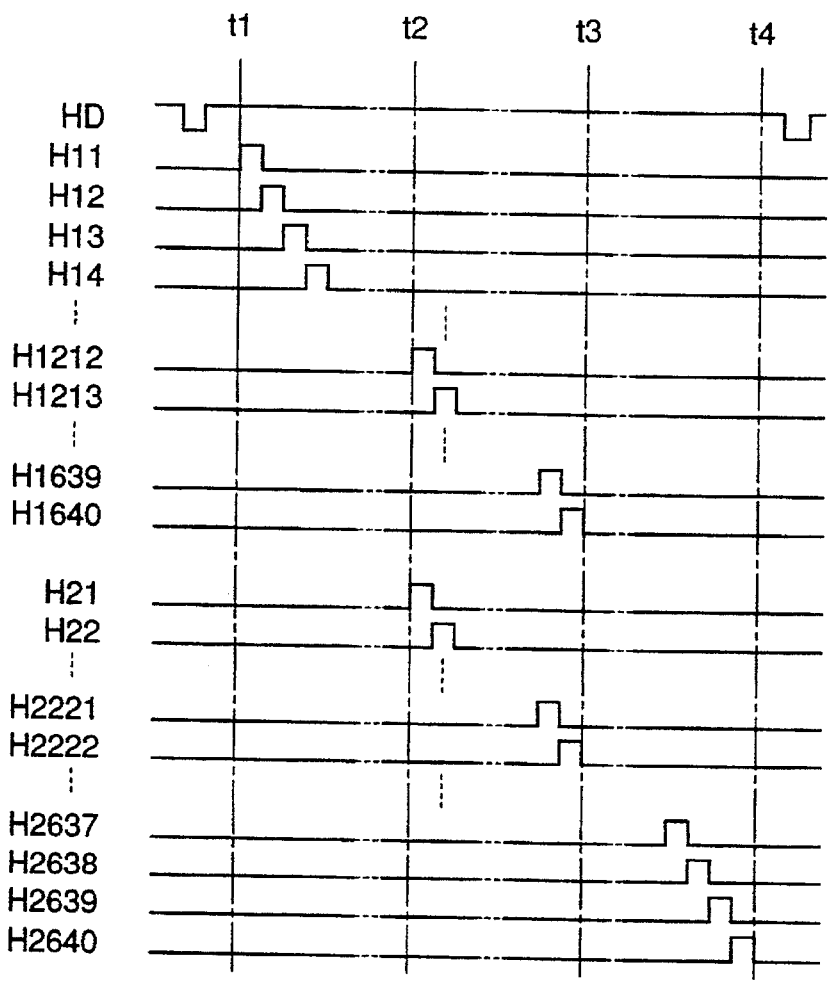
FIGS. 5A, 5B, 13A, and 13B are timing charts for explaining driving of the liquid crystal panel upon reception of, e.g., an HDTV signal.
Figure 5B:
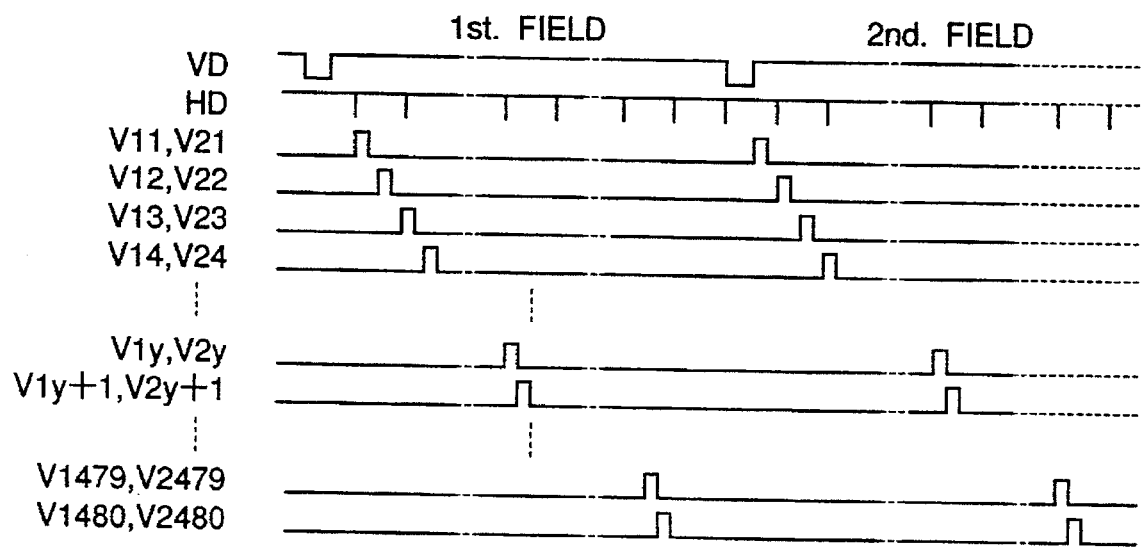
Figures 6A, 6B:
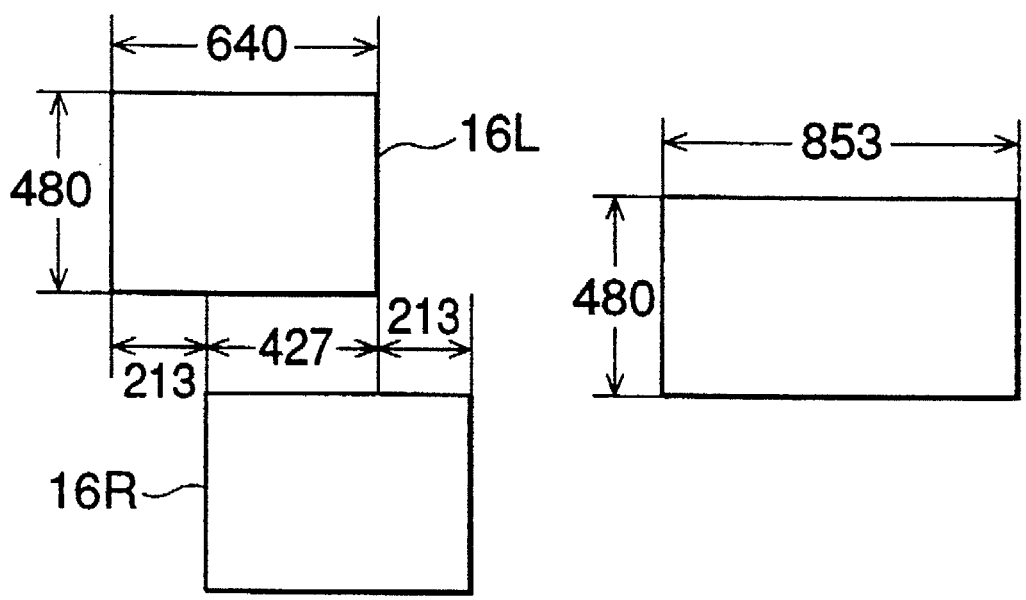
FIGS. 6A, 6B, 14A, 14B, 17, 18, and 24 are views for explaining the display method of two liquid crystal panels upon reception of, e.g., the HDTV signal.

If the discrimination circuit 6 discriminates the input image signal as an HDTV signal, the control circuit 7 connects the switching circuits 12 and 13 to terminals b to supply outputs from the horizontal and vertical scanning circuits 9 and 11 to the liquid crystal panels 16R and 16L. FIG. 5A is a timing chart of scanning pulses output from the horizontal scanning circuit 9. FIG. 5B is a timing chart of scanning pulses output from the vertical scanning circuit 11. At time t1 in FIG. 5A, the control circuit 7 turns the switching circuit 14 on and the switching circuit 15 off, thereby supplying the image signal to only the liquid crystal panel 16L. Horizontal scanning pulses as shown in FIG. 5A are supplied to the liquid crystal panel 16L. At time t2, the control circuit 7 turns the switching circuit 15 on to supply the image signal to the liquid crystal panel 16R and at the same time starts to supply the horizontal scanning pulses. At time t3, when scanning of the 640 pixels in the horizontal direction of the liquid crystal panel 16L is completed, the switching circuit 14 is turned off to stop supplying the horizontal scanning pulses. At time t4, when scanning of the liquid crystal panel 16R in the horizontal direction is completed, the switching circuit 15 is turned off to stop supplying the horizontal scanning pulses. With this operation, the HDTV signal having an aspect ratio of 16:9 is divisionally displayed on the left and right liquid crystal panels 16L and 16R, as shown in FIG. 6A. Images received by the left and right eyes of an observer are fused and recognized as one image having an aspect ratio of 16:9, as shown in FIG. 6B. To obtain an aspect ratio of 16:9, the number of pixels in the horizontal direction must be 853 because the number of pixels in the vertical direction is 480. Assuming that the effective horizontal scanning interval of an HDTV signal is 26 µs, the frequency of the horizontal scanning pulses is represented as follows:

$$1/26 \ \mu s/853 = 32.8 \ MHz$$

When the vertical scanning pulses as shown in FIG. 5B are supplied to the liquid crystal panels 16R and 16L, all scanning lines are scanned in both the 1st and 2nd fields. That is, so-called non-interlaced scanning is performed. With this operation, when the image signal is an HDTV signal, the image signal is divisionally displayed on the left and right liquid crystal panels 16L and 16R by non-interlaced scanning.

In FIG. 6A, a common image portion corresponds to 427 pixels in the horizontal direction of image display.

In this manner, an HDTV signal having an aspect ratio of 16:9 can be displayed using a liquid crystal panel having an aspect ratio of 4:3.

According to this embodiment, an image signal input terminal for receiving an image signal, a discriminating means for determining whether the input image signal is a signal of the NTSC or PAL system having an aspect ratio of 4:3 or a signal of the HDTV system having an aspect ratio of 16:9, and two display means each having an aspect ratio of 4:3 and visible to only a right or left eye are provided. If the discriminating means discriminates the input signal as an signal of the NTSC or PAL system, identical image signals are displayed on the left and right display means by interlaced scanning. If the discriminating means discriminates the input signal as a signal of the HDTV system, the image signal is divisionally displayed on the left and right display means by non-interlaced scanning. With this operation, an image signal having an aspect ratio of 4:3 can be displayed using an inexpensive display means of the conventional NTSC or PAL system having an aspect ratio of 4:3. At the same time, an HDTV signal having an aspect ratio of 16:9 can be displayed using the entire display capabilities of the display means.

Second Embodiment

Figure 7:
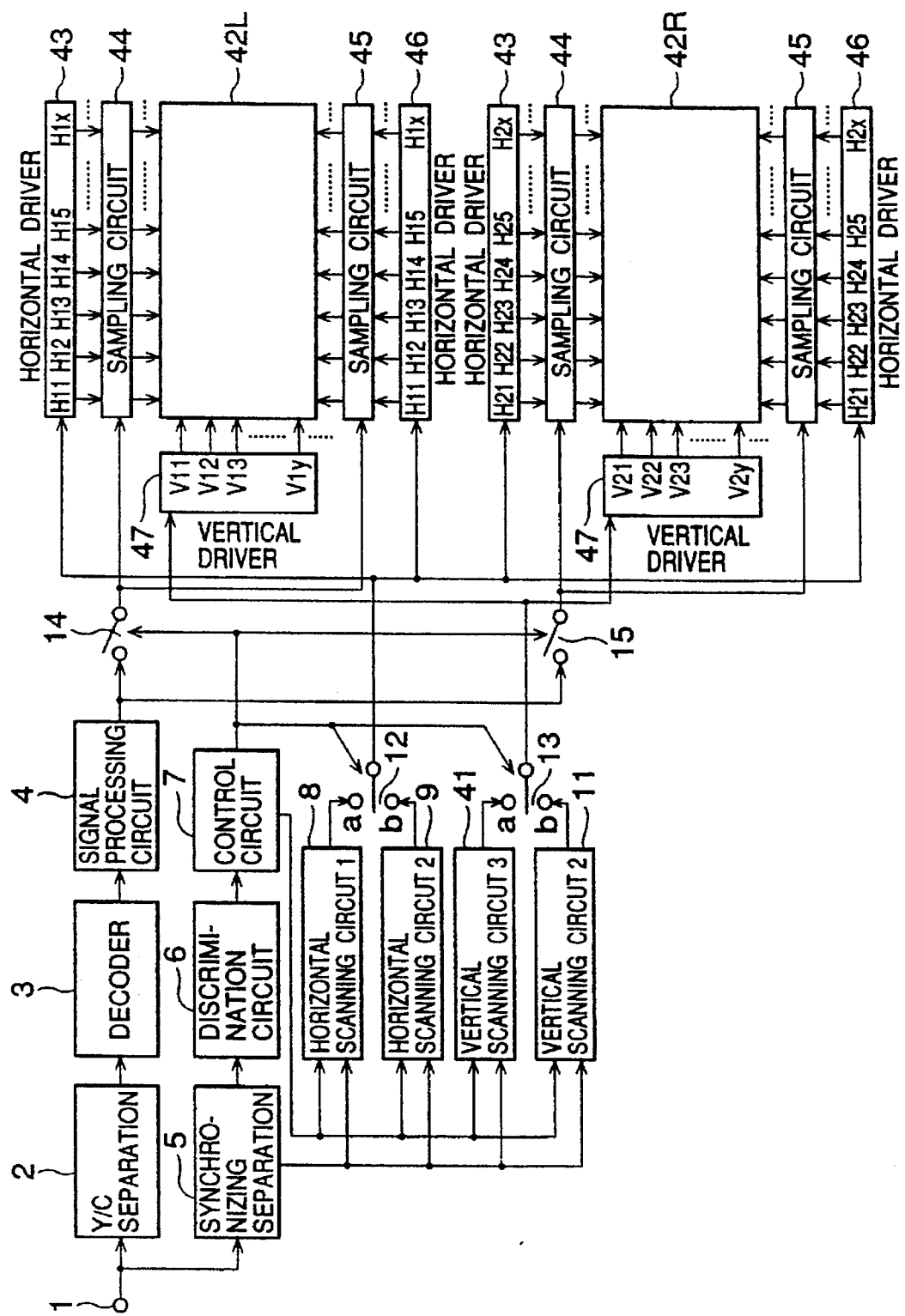

FIG. 7 is a block diagram schematically showing a liquid crystal display apparatus according to the second preferred embodiment of the present invention. The same reference numerals as in FIG. 2 denote the same constituent elements in FIG. 7, and a detailed description thereof will be omitted. Referring to FIG. 7, a vertical scanning circuit 41 generates a vertical scanning pulse for driving liquid crystal panels. A liquid crystal panel 42R is arranged at a position visible to only a right eye, and a liquid crystal panel 42L is arranged at a position visible to only a left eye. Horizontal drivers 43 and 46 convert a horizontal scanning pulse into a voltage for driving the liquid crystal panels. Sampling circuits 44 and 45 sample an input image signal in units of pixels in the horizontal direction so as to display the image signal on the liquid crystal panels. Vertical drivers 47 convert a vertical scanning pulse into a voltage for driving the liquid crystal panels.

Figure 8:
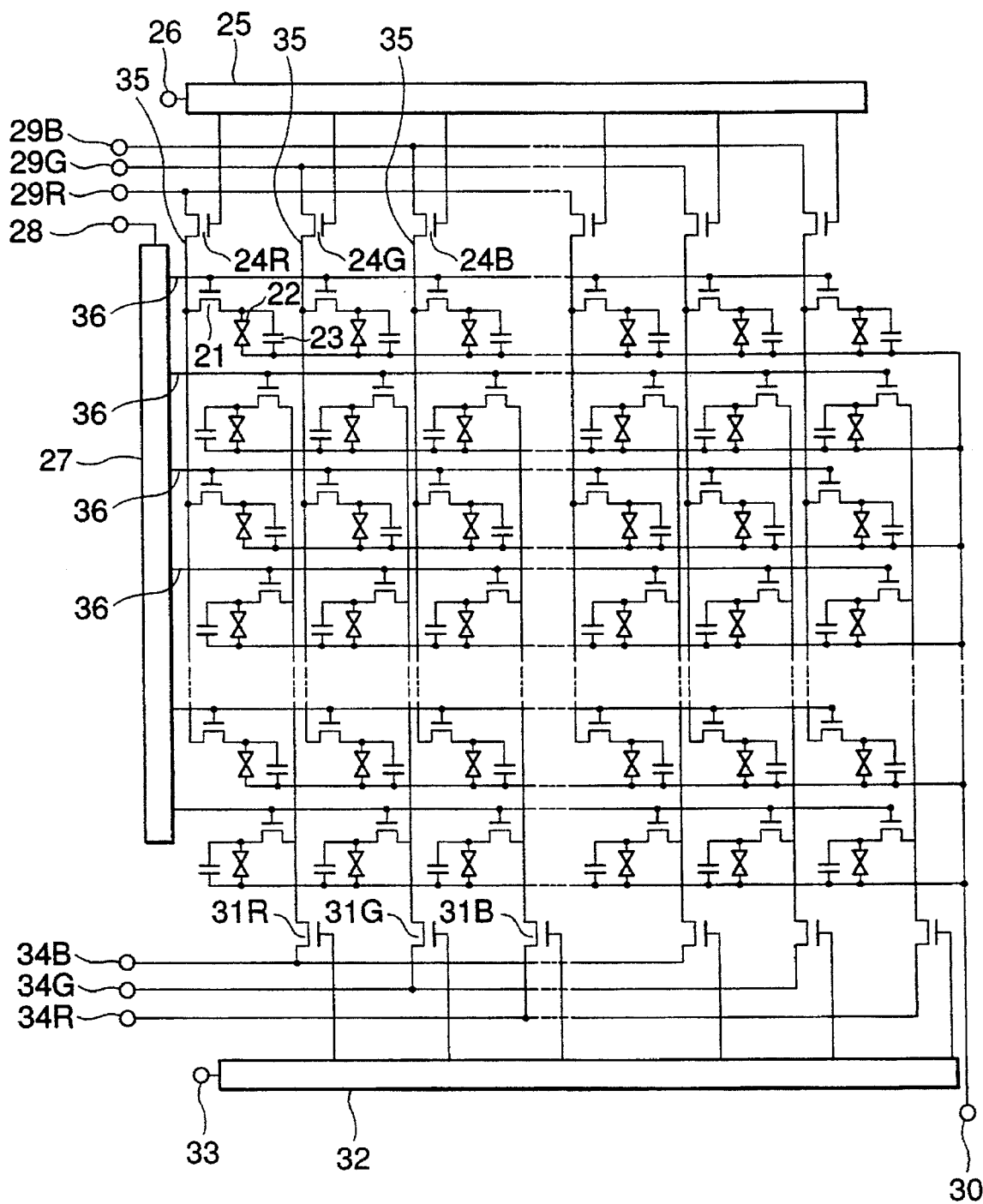
Figure 9A:
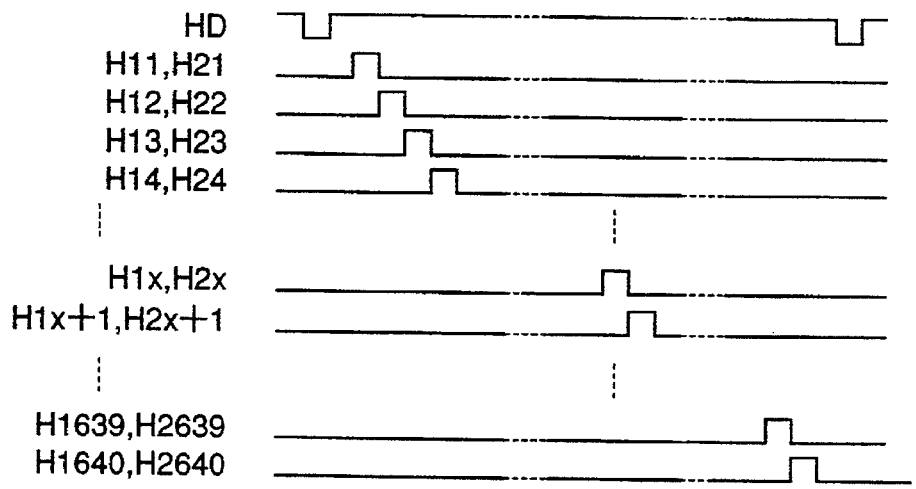
Figure 9B:
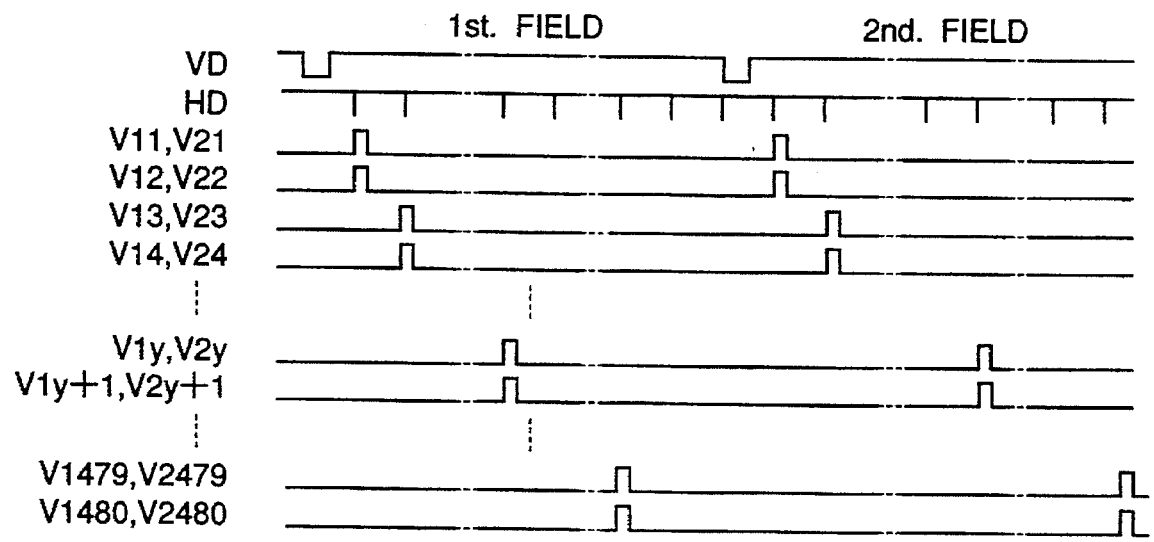

FIG. 8 is a circuit diagram showing the structure of a preferred example of the display panel used as the liquid crystal panel 42R or 42L, which uses a liquid crystal in an X–Y matrix structure. The same reference numerals as in FIG. 3 denote the same constituent elements in FIG. 8. Referring to FIG. 8, the display panel includes switching elements 31R, 31G, and 31B such as FETs (TFTs), a horizontal driver 32, an input terminal 33 for receiving a horizontal scanning pulse, and input terminals 34R, 34G, and 34B for receiving image signal components of primary colors (R, G, and B). The liquid crystal panel in FIG. 8 is different from that in FIG. 3 in the following point. An image signal input from an input terminal 29 (29R, 29G, or 29B) is written in pixels of odd-numbered lines while an image signal input from an input terminal 34 (34R, 34G, or 34B) is written in pixels of even-numbered lines. FIGS. 9A and 9B are timing charts of driving pulses for the liquid crystal panel when an image signal input to the apparatus in FIG. 7 is an NTSC signal.

The operation of the apparatus in FIG. 7 will be described with reference to FIGS. 7 to 9B. If a discrimination circuit 6 in FIG. 7 discriminates an image signal as an NTSC signal, a control circuit 7 turns switching circuits 14 and 15 on to simultaneously supply the image signal to both the liquid crystal panels 42R and 42L. The control circuit 7 connects switching circuits 12 and 13 to terminals a to supply outputs from a horizontal scanning circuit 8 and the vertical scanning circuit 41 to the liquid crystal panels 42R and 42L. FIG. 9A is a timing chart of scanning pulse output from the horizontal scanning circuit 8. As in FIG. 4A of the first embodiment, image signal components input to the sampling circuits 44 and 45 are sequentially sampled, thereby scanning the liquid crystal panels in the horizontal direction. FIG. 9B is a timing chart of scanning pulses output from the vertical scanning circuit 41. When pulses V1y, V2y, Vy1+1, and V2y+1 are output at the same timing, the signals input from the sampling circuits 44 and 45 are simultaneously written in two odd- and even-numbered lines, thereby scanning the liquid crystal panels in the vertical direction.

With this operation, when the image signal is an NTSC signal, identical image signals are displayed on both the liquid crystal panels 42R and 42L by two-line simultaneous write access in odd- and even-numbered lines. In this embodiment, an operation performed upon reception of an HDTV signal is the same as that of the first embodiment.

In this manner, as in the first embodiment, an HDTV signal having an aspect ratio of 16:9 can be displayed using the liquid crystal display apparatus having an aspect ratio of 4:3. In the first embodiment, since interlaced scanning is performed upon reception of an NTSC signal, the vertical driving frequency for the liquid crystal panel becomes 30 Hz, resulting in an increase in flicker. However, in this embodiment, such a problem can be solved. More specifically, in this embodiment, the vertical driving frequency for the liquid crystal panel can be set to 60 Hz by two-line simultaneous write access. For this reason, flicker can be effectively reduced.

Also with the liquid crystal panel in FIG. 8, interlaced scanning can be performed upon reception of an NTSC signal, as in the first embodiment, as a matter of course.

As described above, in the second embodiment of the present invention, when the discriminating means discriminates an input signal as an NTSC or PAL signal, the identical image signals can be displayed on the left and right display units by two-line simultaneous write access, thereby decreasing flicker due to interlaced scanning.

Third Embodiment

Figure 10:
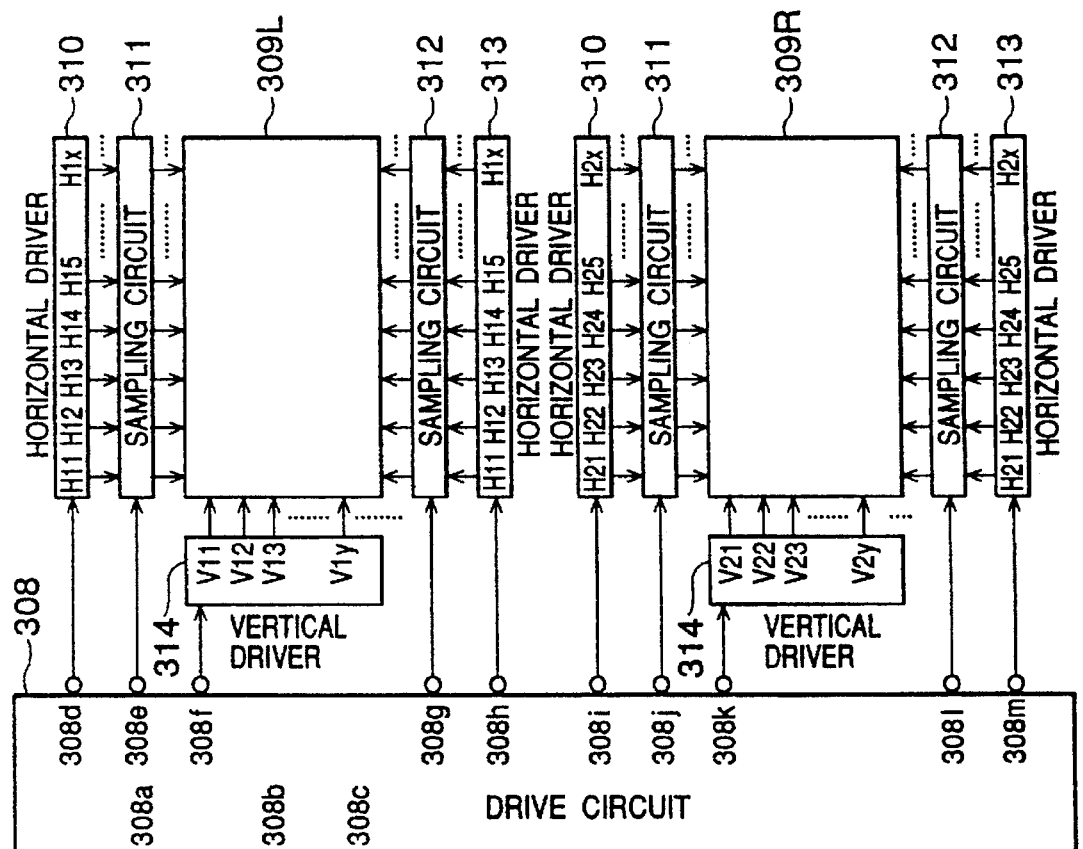
Figure 10:
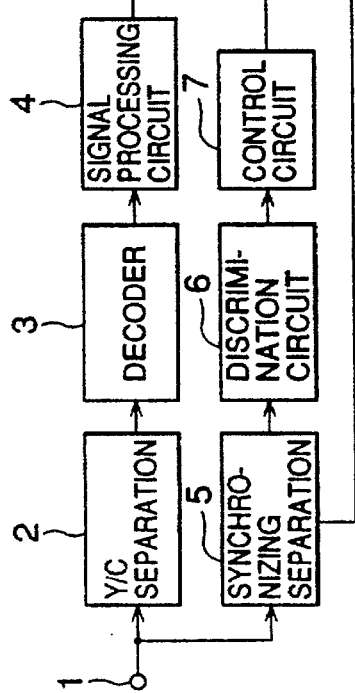

FIG. 10 is a block diagram schematically showing a liquid crystal display apparatus according to the third preferred embodiment of the present invention. Referring to FIG. 10, the liquid crystal display apparatus includes an input terminal 1 for receiving an image signal, a Y/C separation circuit 2 for separating the VIDEO signal into a luminance signal (Y signal) and chrominance signals (C signals), a decoder 3 for generating primary color signals of R, G, and B from the Y and C signals, a signal processing circuit 4 such as an AGC circuit or γ-correction circuit for the liquid crystal panel, a synchronizing separation circuit 5 for separating a synchronizing signal from the image signal, a discrimination circuit 6 for discriminating the system of the input image signal, a control circuit 7 for controlling a method of scanning the liquid crystal panel in accordance with the discrimination result from the discrimination circuit 6, and a drive circuit 308 for driving the liquid crystal panels. A liquid crystal panel 309R is arranged at a position visible to only a right eye, and a liquid crystal panel 309L is arranged at a position visible to only a left eye. Horizontal drivers 310 and 313 convert a horizontal scanning pulse into a voltage for driving the liquid crystal panel. Sampling circuits 311 and 312 sample the input image signal in units of pixels in the horizontal direction so as to display the image signal on the liquid crystal panels. Vertical drivers 314 convert a vertical scanning pulse into a voltage for driving the liquid crystal panels. As the liquid crystal panel in FIG. 10, the display panel shown in FIG. 8 can be used.

The operation of the liquid crystal display apparatus will be described with reference to FIG. 8. When a horizontal scanning pulse is input from an input terminal 26, the scanning pulse is converted into a predetermined voltage by a horizontal driver 25 and supplied to the gates of switching elements 24R, 24G, and 24B, thereby sequentially turning the switches on in the horizontal direction. Image signal components input from input terminals 29R, 29G, and 29B are sampled and supplied to vertical signal lines. One end of each of switching elements 21 of odd-numbered lines is connected to the corresponding vertical signal line. The other end is connected to a corresponding liquid crystal cell 22 and a corresponding holding capacitor 23. When a vertical scanning pulse is input from an input terminal 28, the scanning pulse is converted into a predetermined voltage by a vertical driver 27 and supplied to the gates of the switching elements 21 through predetermined horizontal gate lines, thereby turning the switches on. With this operation, a charge corresponding to a potential difference between a signal supplied to an input terminal 29 and a voltage applied to a common electrode 30 is held in the liquid crystal cells 22 and the holding capacitors 23. At this time, a predetermined voltage is applied to the common electrode 30. Similarly, an image signal input from an input terminal 34 is written in pixels of even-numbered lines by horizontal scanning pulses input from an input terminal 33. By repeating this operation in the vertical direction, an image corresponding to one frame can be displayed on the liquid crystal display apparatus in FIG. 8.

Figure 11:
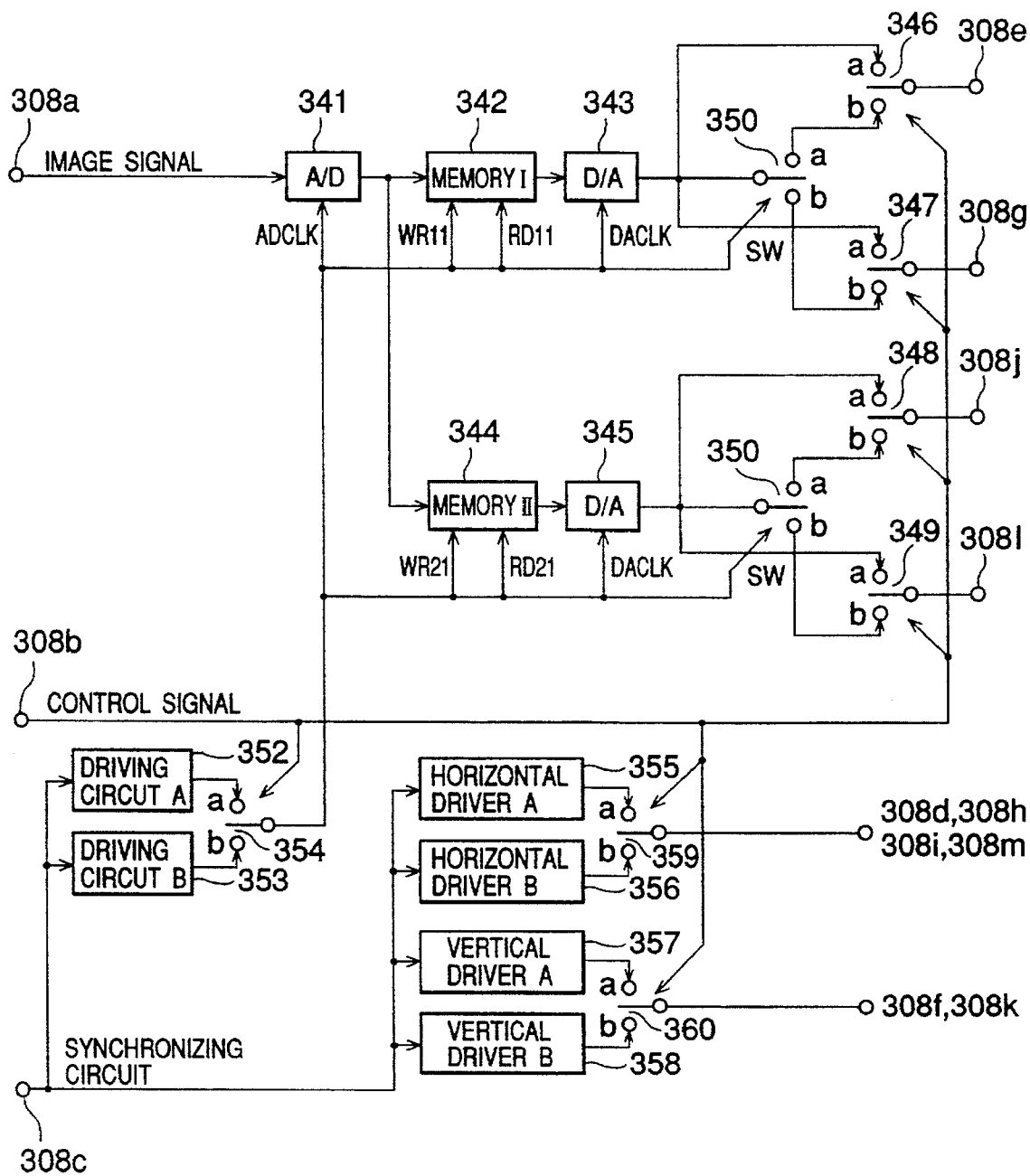

FIG. 11 is a detailed circuit diagram of the drive circuit 308 shown in FIG. 10 of the third embodiment of the present invention. Referring to FIG. 11, the drive circuit 308 includes an input terminal 308a for receiving an image signal, an input terminal 308b for receiving a control signal, an input terminal 308c for receiving a synchronizing signal, an A/D conversion circuit 314, memories 342 and 344, D/A conversion circuits 343 and 345, switching circuits 346 to 351, 354, 359, and 360, driving circuits 352 and 353 for the A/D conversion circuit, the memories, and the D/A conversion circuits, horizontal drivers 355 and 356 for the liquid crystal panels, vertical drivers 357 and 358 for the liquid crystal panels, output terminals 308e, 308g, 308j, and 308l for outputting image signal components output terminals 308d, 308h, 308i, and 308m for outputting horizontal scanning pulses, and output terminals 308f and 308k for outputting vertical scanning pulses.

FIGS. 12A to 13B are timing charts showing preferred examples of driving pulses for the liquid crystal display apparatus of the third embodiment of the present invention.

An operation of the liquid crystal display apparatus of the third embodiment of the present invention will be described with reference to FIGS. 8 and 10 to 13B. An image signal input from the input terminal 1 is separated into a Y signal and C signals by the Y/C separation circuit 2. The Y and C signals are converted into primary color signals of R, G, and B by the decoder 3. Processing such as AGC or γ-correction is performed by the signal processing circuit 4. At the same time, a synchronizing signal is separated from the image signal input from the input terminal 1 by the synchronizing separation circuit 5 and input to the discrimination circuit 6. It is determined whether the input signal is a signal of the NTSC or PAL system having an aspect ratio of 4:3 or a signal of the HDTV system having an aspect ratio of 16:9 (the system having an aspect ratio of 4:3 is represented by the NTSC system in the following description). The control circuit 7 controls the drive circuit 308 on the basis of the result obtained upon determination of the system of the image signal by the discrimination circuit 6, and the liquid crystal panels 309R and 309L are driven in accordance with output signals from the drive circuit 308.

Operations of the drive circuit 308 for an NTSC signal and an HDTV signal will be independently described below. The liquid crystal display apparatus used in this embodiment is assumed to have 640 pixels in the horizontal direction and 480 pixels in the vertical direction.

Figure 12A:
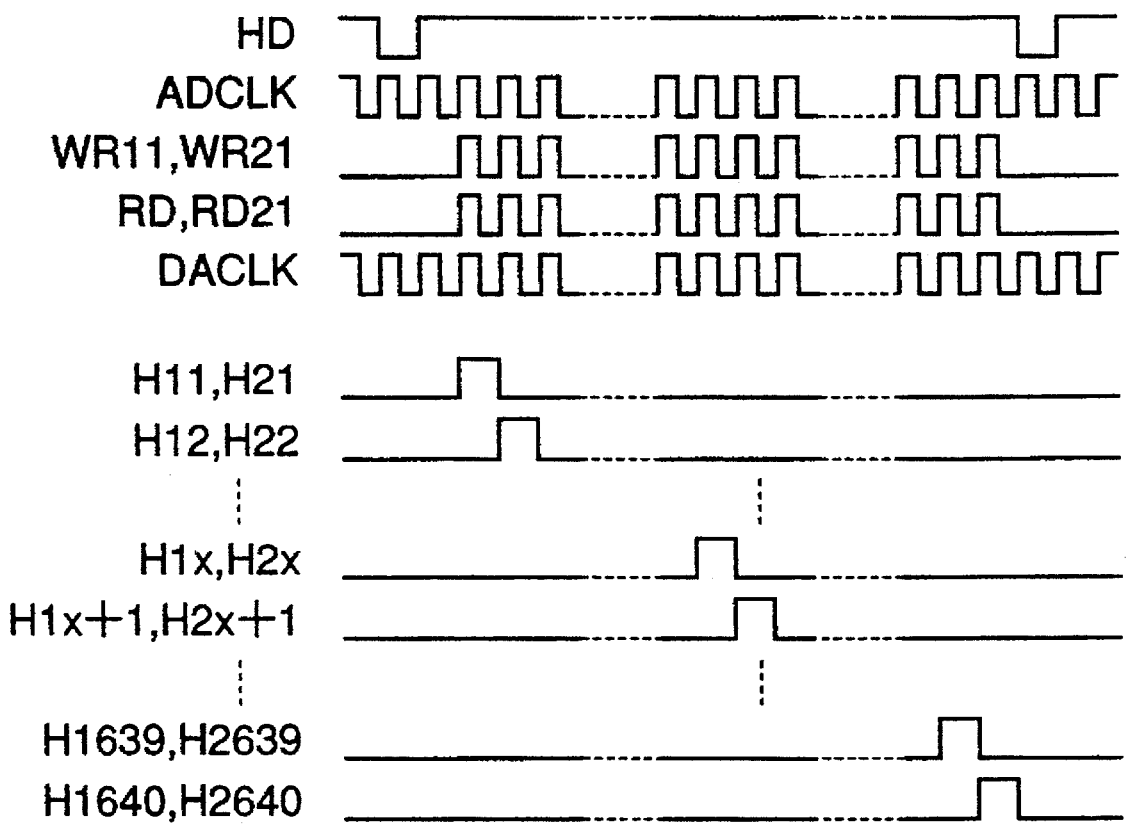

If the discrimination circuit 6 discriminates an image signal as an NTSC signal, all the switching circuits 346 to 349, 354, 359, and 360 are connected to terminals a in accordance with a control signal from the control circuit 7, which is input from the input terminal 308b. The image signal input from the input terminal 308a is input to the A/D conversion circuit 341 and converted from an analog signal into a digital signal. An output from the A/D conversion circuit 341 is stored in the memory I 342 and the memory II 344. An output from the memory I 342 is converted into an analog signal by the D/A conversion circuit 343 and output to the output terminal 308e through the switching circuit 346 and to the output terminal 308g through the switching circuit 347. At the same time, an output from the memory II 344 is converted into an analog signal by the D/A conversion circuit 345 and output to the output terminal 308j through the switching circuit 348 and to the output terminal 308l through the switching circuit 349. FIG. 12A is a timing chart of a driving pulse (ADCLK) for the A/D conversion circuit, write pulses (WR) and read pulses (RD) for the memories, and a driving pulse (DACLK) for the D/A conversion circuit, all of which are output from the driving circuit A 352. Assuming that the effective horizontal scanning interval of the NTSC signal is 52 μs, each pulse frequency is represented as follows:

$$1/52\ \mu s/640 = 12.3\ MHz$$

Figure 12B:
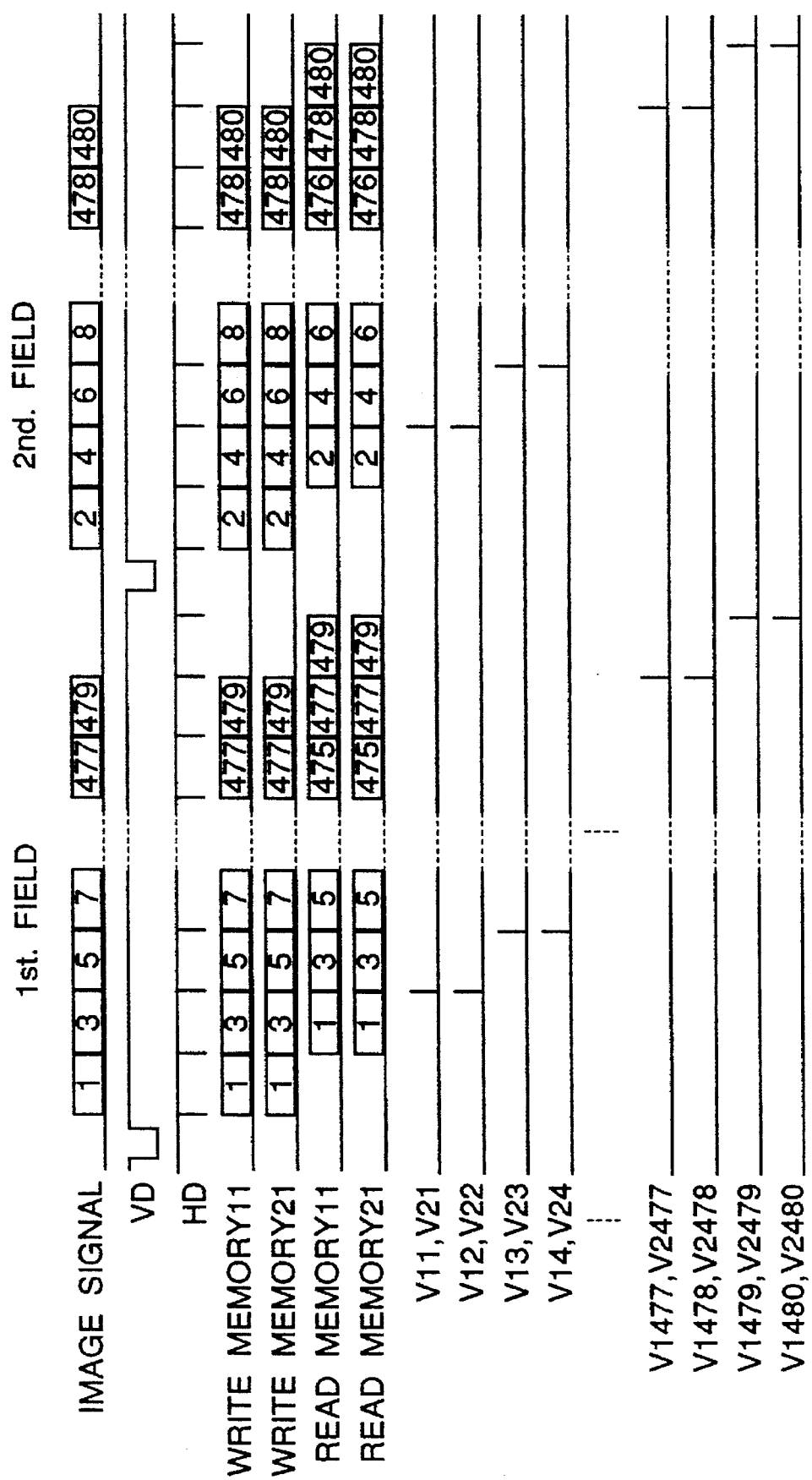

Horizontal scanning pulses output from the horizontal driver A 355 are also shown in FIG. 12A. Vertical scanning pulses output from the vertical driver A 357 are shown in FIG. 12B.

When these output signals are input from the drive circuit 308 to the liquid crystal panels 309R and 309L, identical signals are simultaneously supplied to the sampling circuits 311 and 312. These signals are sequentially sampled by horizontal scanning pulses, thereby scanning the liquid crystal panels in the horizontal direction. As shown in FIG. 12B, vertical scanning pulses V1y, V2y, V1y+1, and V2y+1 have the same timing. For this reason, signals output from the sampling circuits 311 and 312 are simultaneously written in two odd- and even-numbered lines, thereby scanning the liquid crystal panels in the vertical direction.

With this operation, when the image signal is an NTSC signal, identical image signals are supplied to both the liquid crystal panels 309R and 309L and displayed by two-line simultaneous write access in which identical signals are simultaneously written in two odd- and even-numbered lines.

Figure 13A:
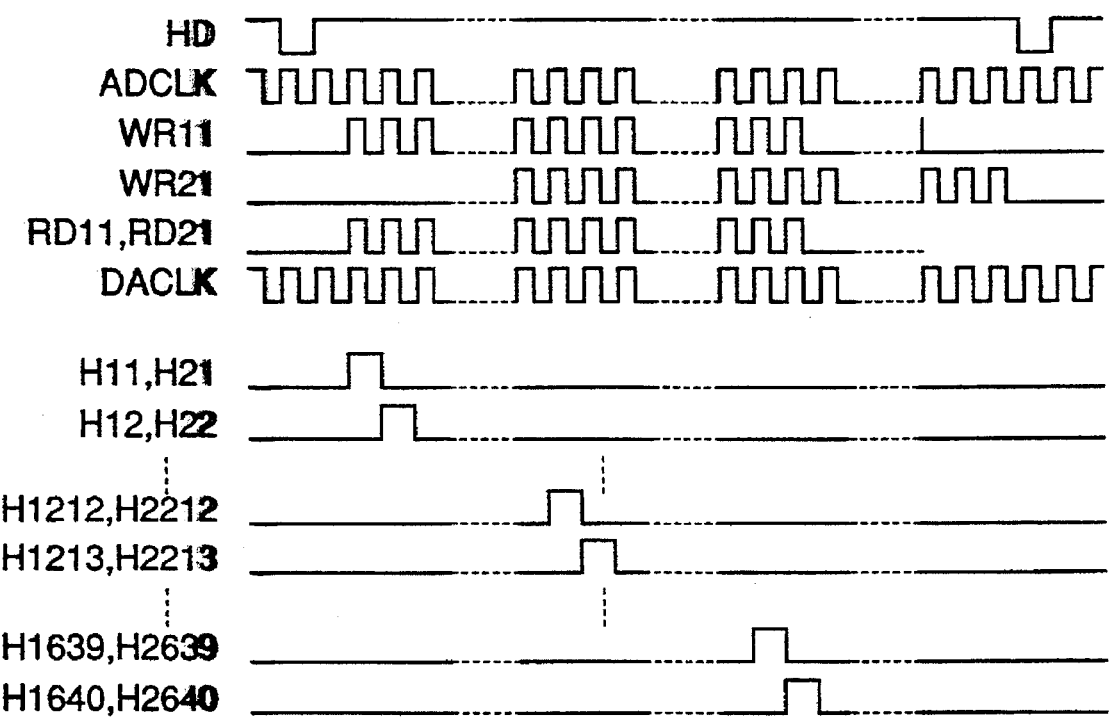
Figure 13B:
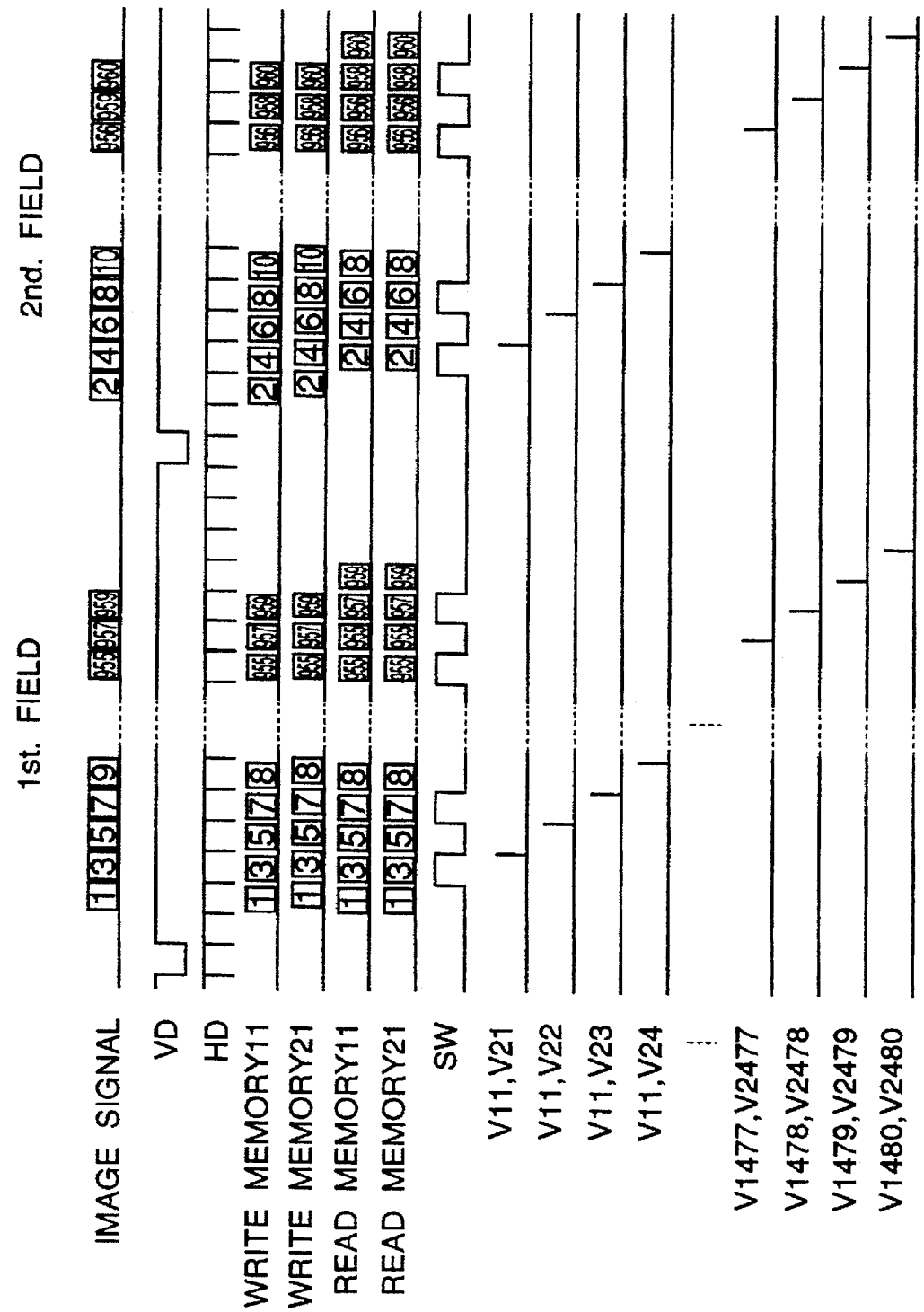
Figures 14A, 14B:
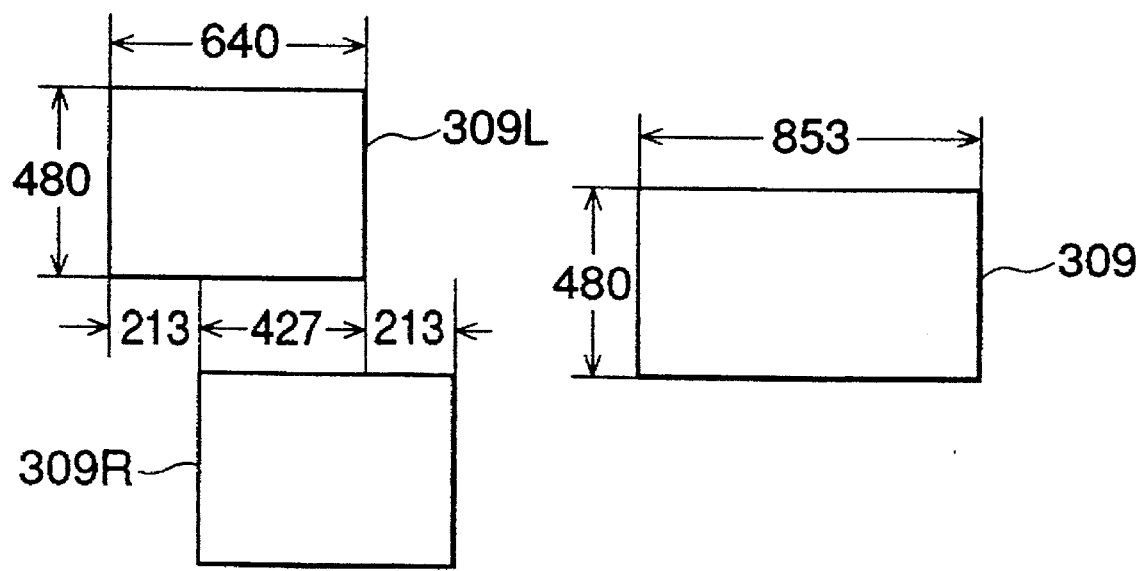

If the discrimination circuit 6 discriminates the image signal as an HDTV signal, all the switching circuits 346 to 349, 359, and 360 are connected to terminals b in accordance with a control signal from the control circuit 7, which is input from the input terminal 308b. The image signal input from the input terminal 308a is input to the A/D conversion circuit 341 and converted from an analog signal into a digital signal. An output from the A/D conversion circuit 341 is stored in the memory I 342 and the memory II 344. An output from the memory I 342 is converted into an analog signal by the D/A conversion circuit 343 and supplied to the switching circuit 350. Similarly, an output from the memory II 344 is converted into an analog signal by the D/A conversion circuit 345 and supplied to the switching circuit 351. The switching circuits 350 and 351 are controlled by a pulse SW as shown in FIG. 13B. When the pulse SW is at high level, the switching circuits 350 and 351 are connected to the terminals a. When the pulse is at low level, the switching circuits 350 and 351 are connected to the terminals b. The level of the pulse is switched every 1H interval. Upon connection to the terminal a, the image signal components are output to the output terminals 308e and 308j through the switching circuits 346 and 348. Upon connection to the terminals b, the image signal components are output to the output terminals 308g and 308l through the switching circuits 347 and 349. FIG. 13A is a timing chart showing driving pulses output from the driving circuit B 353 to the A/D conversion circuit, the memories, and the D/A conversion circuits. With this operation, an HDTV signal having an aspect ratio of 16:9 is divisionally displayed on the left and right liquid crystal panels 309L and 309R, as shown in FIG. 14A. The two signals are fused and displayed such that the two liquid crystal panels are recognized as a liquid crystal panel 309 having an aspect ratio of 16:9, as shown in FIG. 14B. To obtain an aspect ratio of 16:9, the number of pixels in the horizontal direction must be 853 because the number of pixels in the vertical direction is 480. Assuming that the effective horizontal scanning interval of the HDTV signal is 26 μs, each pulse frequency is represented as follows:

$$1/26\ \mu s/640 = 32.8\ MHz$$

A relationship between the write pulse for the memory I and that for the memory II is shown in FIG. 13A. The HDTV signal having an aspect signal of 16:9 is divided into left and right components. A signal to be displayed on the left-eye liquid crystal panel 309L is stored in the memory I, and a signal to be displayed on the right-eye liquid crystal panel 309R is stored in the memory II. These signals are read out from the memories by the same read pulses. By repeating this operation in the vertical direction, a relationship as shown in FIG. 13B is set between a signal written in the memory and a signal read out from the memory.

Horizontal scanning pulses output from the horizontal driver B 356 are shown in FIG. 13A, and vertical scanning pulses output from the vertical driver B 358 are shown in FIG. 13B.

When these output signals are input from the drive circuit 308 to the liquid crystal panels 309R and 309L, image signal components are supplied to the sampling circuits 311 and 312 every 1H interval. These signal components are sequentially sampled by the horizontal scanning pulses, thereby scanning the liquid crystal panels in the horizontal direction. The vertical scanning pulses are shown in FIG. 13B. All scanning lines are scanned in the 1st and 2nd fields. That is, so-called non-interlaced scanning is performed.

With this operation, when the image signal is an HDTV signal, the image signal is divided for the left and right liquid crystal panels 309L and 309R and displayed by non-interlaced scanning.

In the above-described manner, both an image signal having an aspect ratio of 4:3 and an HDTV signal having an aspect ratio of 16:9 can be displayed using a liquid crystal panel having an aspect ratio of 4:3.

Fourth Embodiment

Figure 15:
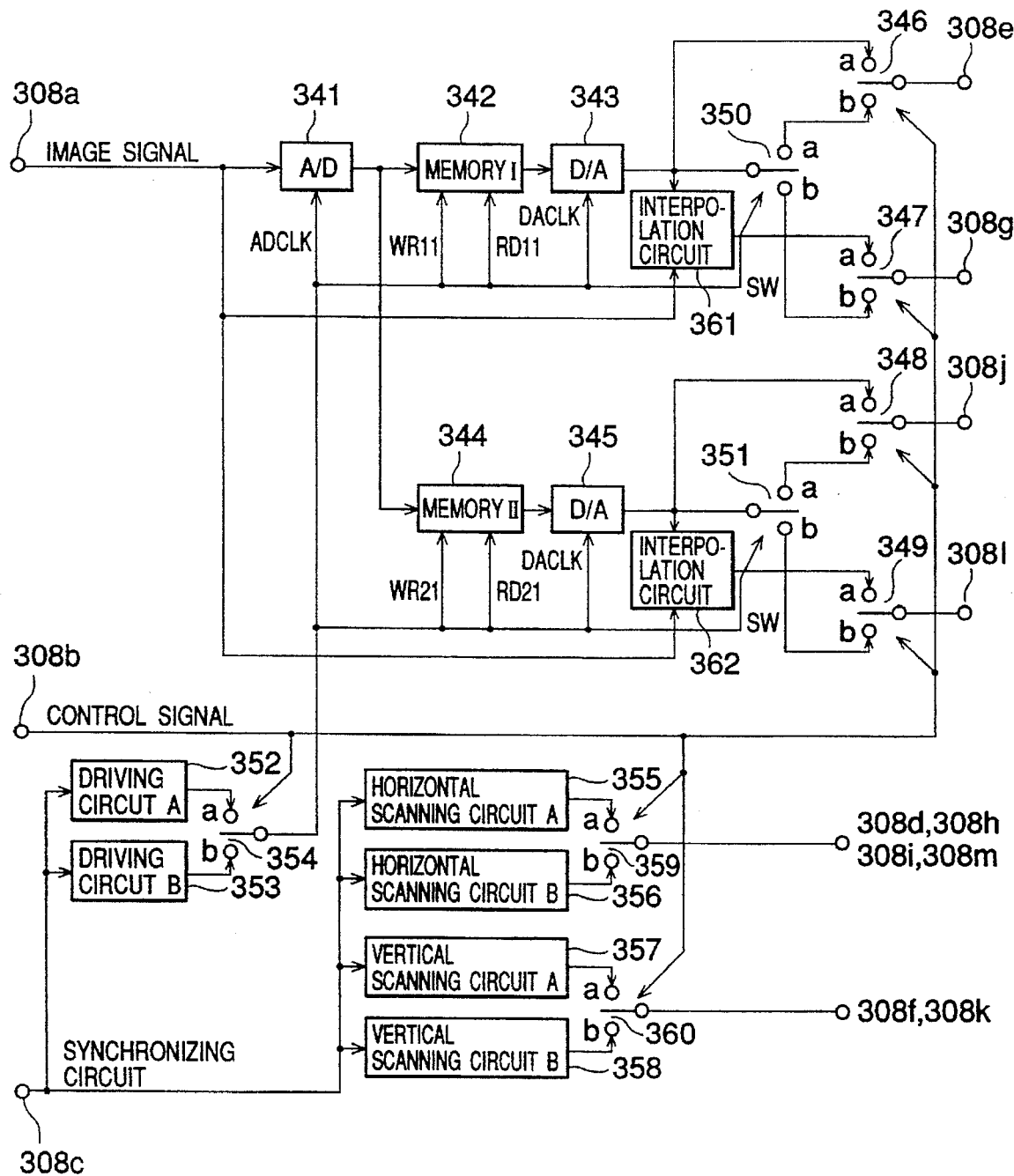

FIG. 15 is a detailed circuit diagram of a drive circuit of a liquid crystal display apparatus according to the fourth preferred embodiment of the present invention. In this embodiment, the arrangement of all the blocks is the same as that shown in FIG. 10 except for a drive circuit 308, and a detailed description thereof will be omitted. The same reference numerals as in FIG. 11 denote the same constituent elements in FIG. 15, and a detailed description thereof will be omitted. Referring to FIG. 15, the drive circuit includes interpolation circuits 361 and 362. In this embodiment, the driving timing of the liquid crystal panel is the same as that shown in FIG. 12A to 13B of the third embodiment.

In this embodiment, if a discrimination circuit 6 discriminates an image signal as an NTSC signal, all switching circuits 346 to 349, 354, 359, and 360 are connected to terminals a in accordance with a control signal from a control circuit 7, which is input from an input terminal 308b. The image signal input from an input terminal 308a is input to an A/D conversion circuit 341 and converted from an analog signal into a digital signal. An output from the A/D conversion circuit 341 is stored in a memory I 342 and a memory II 344. An output from the memory I 342 is converted into an analog signal by a D/A conversion circuit 343 and supplied to an output terminal 308e through the switching circuit 346 and at the same time input to the interpolation circuit 361. At this time, an image signal after a 1H interval is simultaneously input to the interpolation circuit 361. The interpolation circuit 361 generates an interpolation signal from the two signals and outputs the interpolation signal to an output terminal 308g through the switching circuit 347. Similarly, an output from the memory II 344 is converted into an analog signal by a D/A conversion circuit 345 and supplied to an output terminal 308j through the switching circuit 348 and at the same time input to the interpolation circuit 362. At this time, an image signal after a 1H interval is simultaneously input to the interpolation circuit 362. The interpolation circuit 362 generates an interpolation signal from the two signals and outputs the interpolation signal to an output terminal 308l through the switching circuit 349.

The subsequent operation is the same as that in the third embodiment. An operation performed when the image signal is an HDTV signal is the same as that in the third embodiment.

In this manner, both an image signal having an aspect ratio of 4:3 and an HDTV signal having an aspect ratio of 16:9 can be displayed on liquid crystal panels having an aspect ratio of 4:3, as in the third embodiment. In the third embodiment, identical signals are written in two lines. In this embodiment, however, a signal for interpolating the signal of one of two lines in the vertical direction is written. Therefore, fold-over distortion in the vertical direction can be reduced.

Fifth Embodiment

Figure 16:
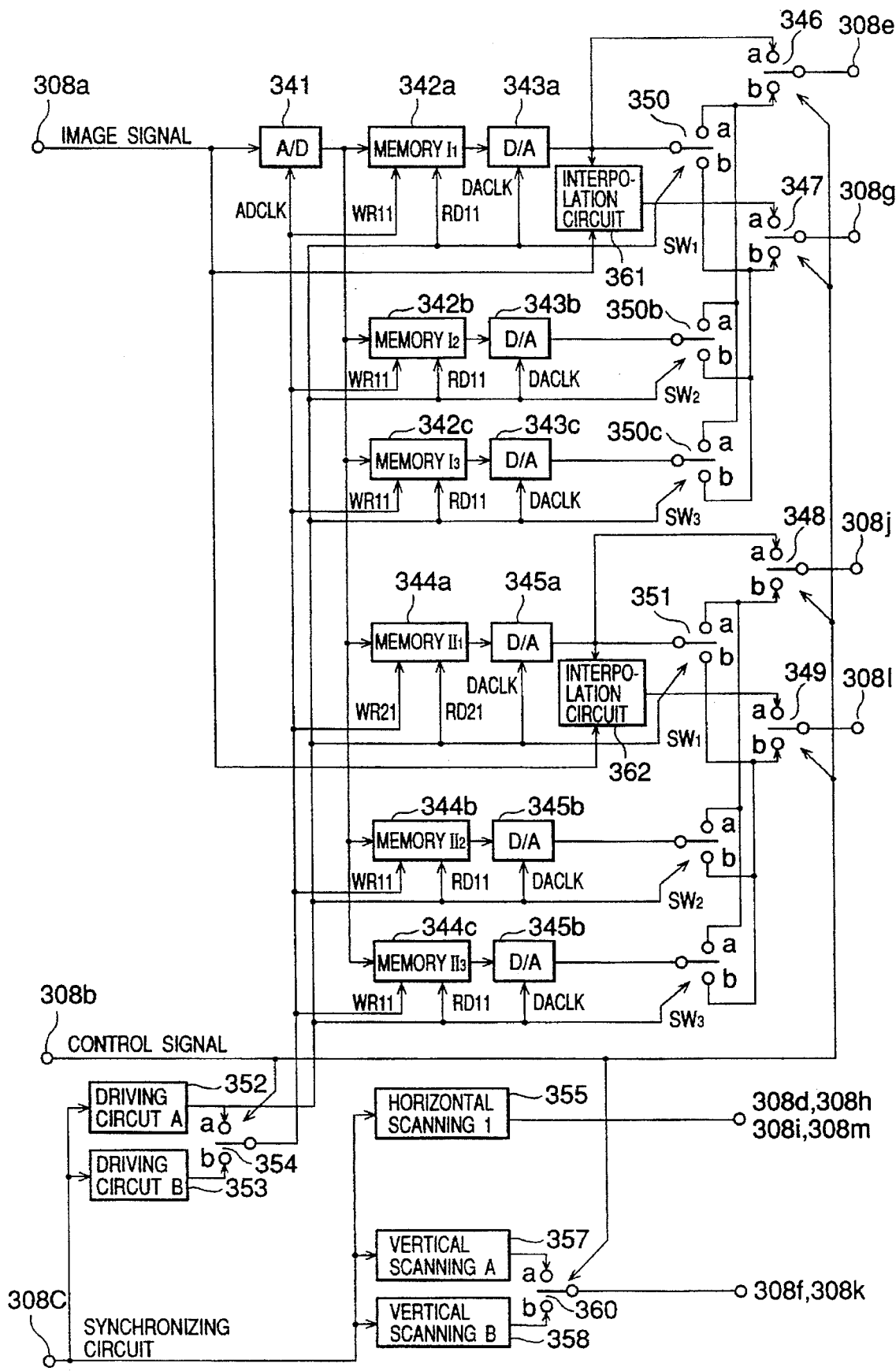

FIG. 16 is a detailed circuit diagram of a drive circuit of a liquid crystal display apparatus according to the fifth preferred embodiment of the present invention. In this embodiment, the arrangement of all the blocks is the same as that shown in FIG. 10 except for a drive circuit 308, and a detailed description thereof will be omitted. The same reference numerals as in FIGS. 11 and 15 denote the same constituent elements in FIG. 16, and a detailed description thereof will be omitted.

In this embodiment, an operation performed when an image signal is an NTSC signal is the same as that in the fourth embodiment, and a detailed description thereof will be omitted.

If a discrimination circuit 6 discriminates an image signal as an HDTV signal, all switching circuits 346 to 349, 354, and 360 are connected to terminals b in accordance with a control signal from a control circuit 7, which is input from an input terminal 308b. The image signal input from an input terminal 308a is input to an A/D conversion circuit 341 and converted from an analog signal into a digital signal. An output from the A/D conversion circuit 341, which is the HDTV signal having an aspect ratio of 16:9, is divided into left and right components. A signal to be displayed on a left-eye liquid crystal panel 309L is stored in a memory $I_1$ 342a, a memory $I_2$ 342b, and a memory $I_3$ 342c in an order named every 1H interval by write pulses shown in FIG. 17. A signal to be displayed on a right-eye liquid crystal panel 309R is similarly stored in a memory $II_1$ 344a, a memory $II_2$ 344b, and a memory $II_3$ 344c in an order named every 1H interval. This operation is sequentially repeated. The frequencies of driving pulses for the A/D conversion circuit and the write pulses are the same as those in the third and fourth embodiments, and the A/D conversion circuit is driven by an output pulse from a driving circuit B 353. Reading from each memory and the D/A conversion circuits are driven by outputs from a driving circuit A 352. More specifically, the reading frequency from the memory is the same as that for an NTSC signal, as shown in FIG. 18. A relationship as shown in FIG. 18 is set between a signal written in the memory and a signal read out from the memory.

Signals read out from the memories at these timings are converted from digital signals into analog signals by the D/A conversion circuits and supplied to switching circuits 350a to 350c and 351a to 351c. Therefore, the image signal components at this time are elongated to an NTSC rate as a function of time.

The switching circuits are controlled by pulses SW1 to SW3 as shown in FIG. 18. The switching circuit is connected to a terminal a when a pulse SW is at high level and to a terminal b when the pulse SW is at low level. The image signal components are output to output terminals 308e and 308j through the switching circuits 346 and 348 when the switching circuits 350a to 350c and 351a to 351c are connected to the terminals a and to output terminals 308g and 308l through the switching circuit 347 and 349 when the switching circuits 350a to 350c and 351a to 351c are connected to the terminals b. When the switching circuits are controlled at timings shown in FIG. 18, signal components to be written in odd-numbered lines of the liquid crystal panel are output to the output terminals 308e and 308j through the switching circuits 346 and 348, and signal components to be written in even-numbered lines of the liquid crystal panel are output to the output terminals 308g and 308l through the switching circuits 347 and 349.

Figure 17:
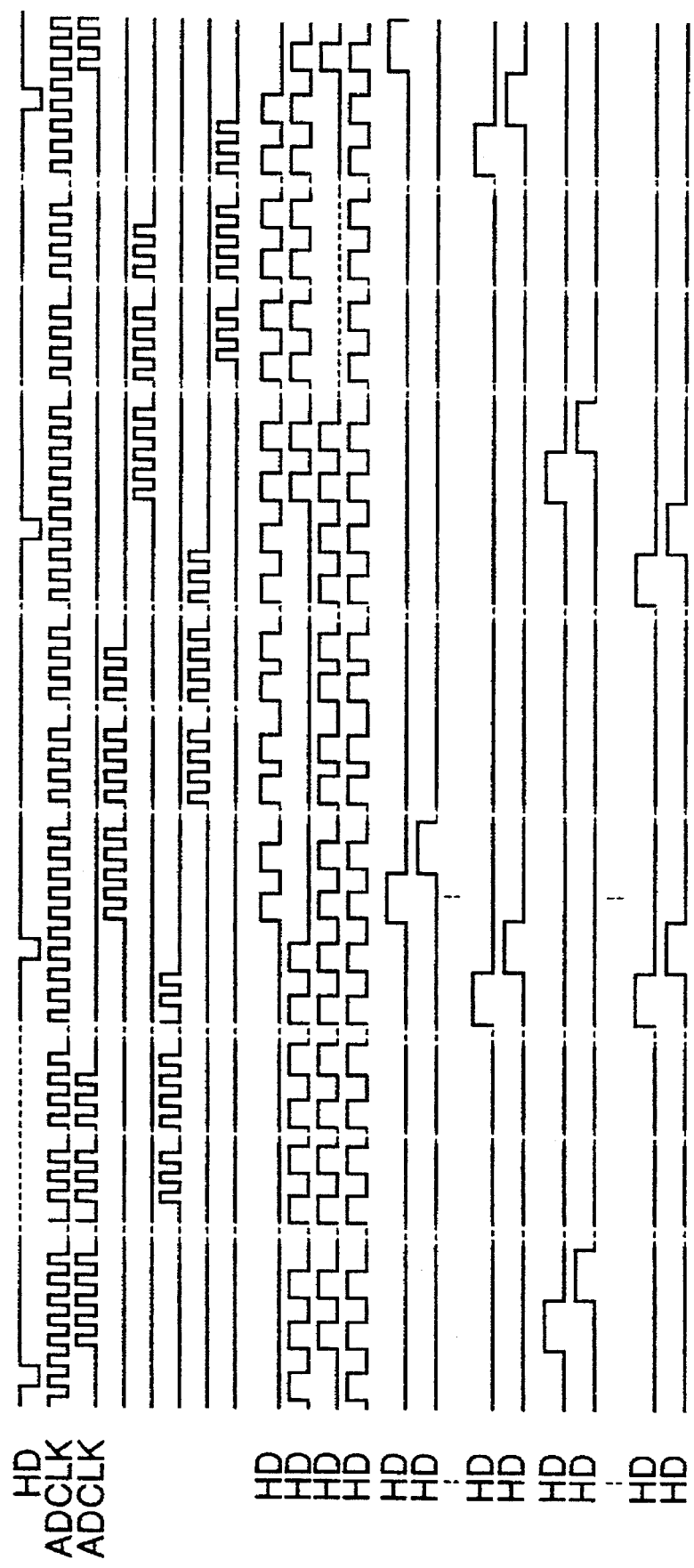
Figure 18:
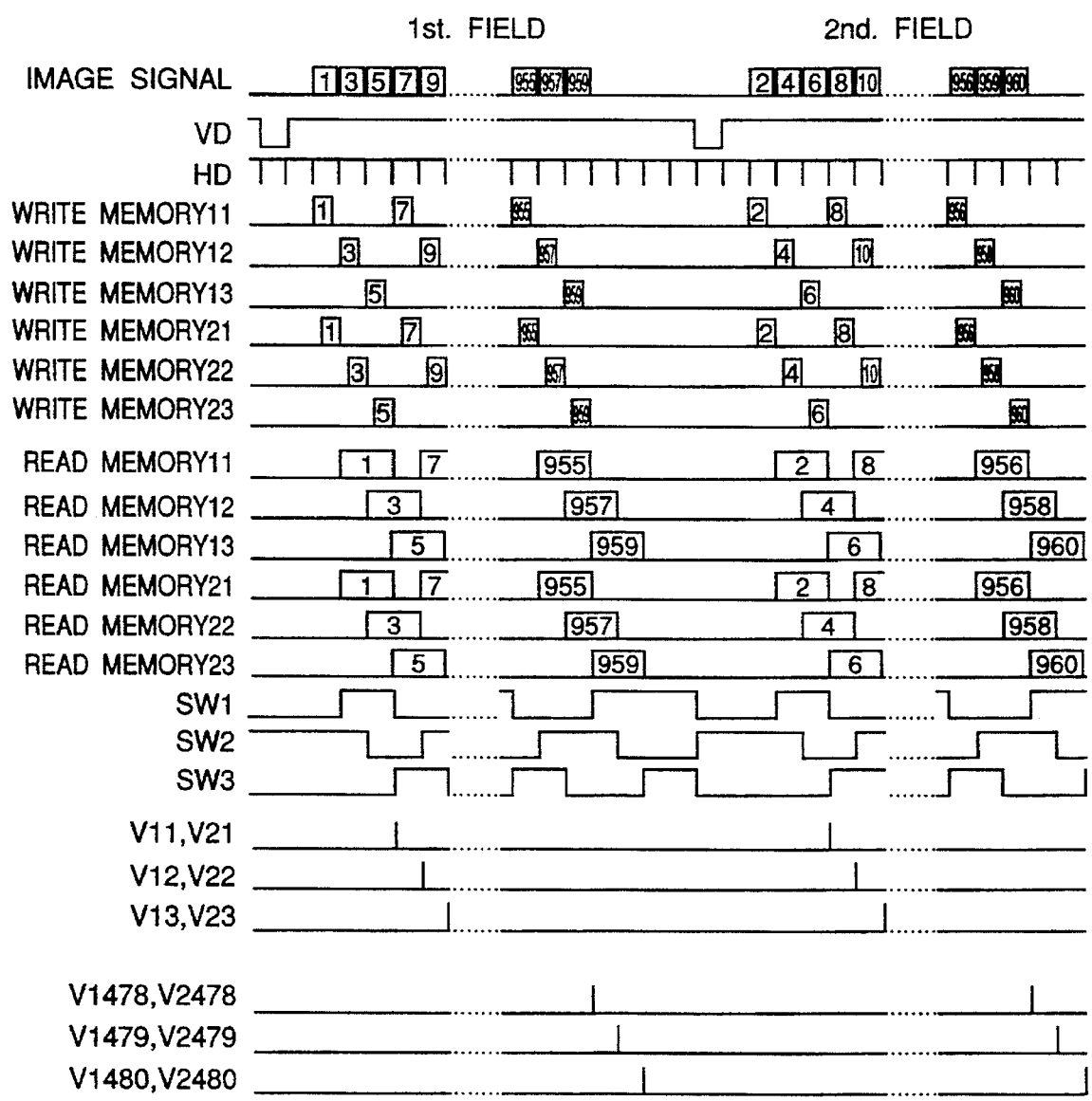

Horizontal scanning pulses as shown in FIG. 17 are output from a horizontal scanning circuit A 355 to output terminals 308d, 308h, 308i, and 308m and supplied to the liquid crystal panels 309R and 309L. Vertical scanning pulses as shown in FIG. 18 are output from a vertical scanning circuit B 358 to output terminals 308f and 308k and supplied to the liquid crystal panels 309R and 309L.

When these output signals are input from the drive circuit 308 to the liquid crystal panels 309R and 309L, image signal components are supplied to sampling circuits 311 and 312 every 1H interval. Since the one-line interval of the supplied image signal is elongated to a 1H interval of the NTSC system, the horizontal scanning pulse for sampling the signal has the same frequency as that of the horizontal scanning pulse for the NTSC signal. Since the vertical scanning pulses as shown in FIG. 18 are output, all scanning lines are scanned in the 1st and 2nd fields. That is, so-called non-interlaced scanning is performed.

With this operation, the same effect as in the third and fourth embodiments can be obtained. At the same time, when an image signal is an HDTV signal, the image signal is elongated to the NTSC rate as a function of time and supplied to the liquid crystal panels, thereby equalizing the driving frequency for horizontal scanning of the liquid crystal panels with that for an NTSC signal.

A liquid crystal display apparatus preferably applicable to the present invention will be described below with reference to the accompanying drawings.

Sixth Embodiment

Figure 19:
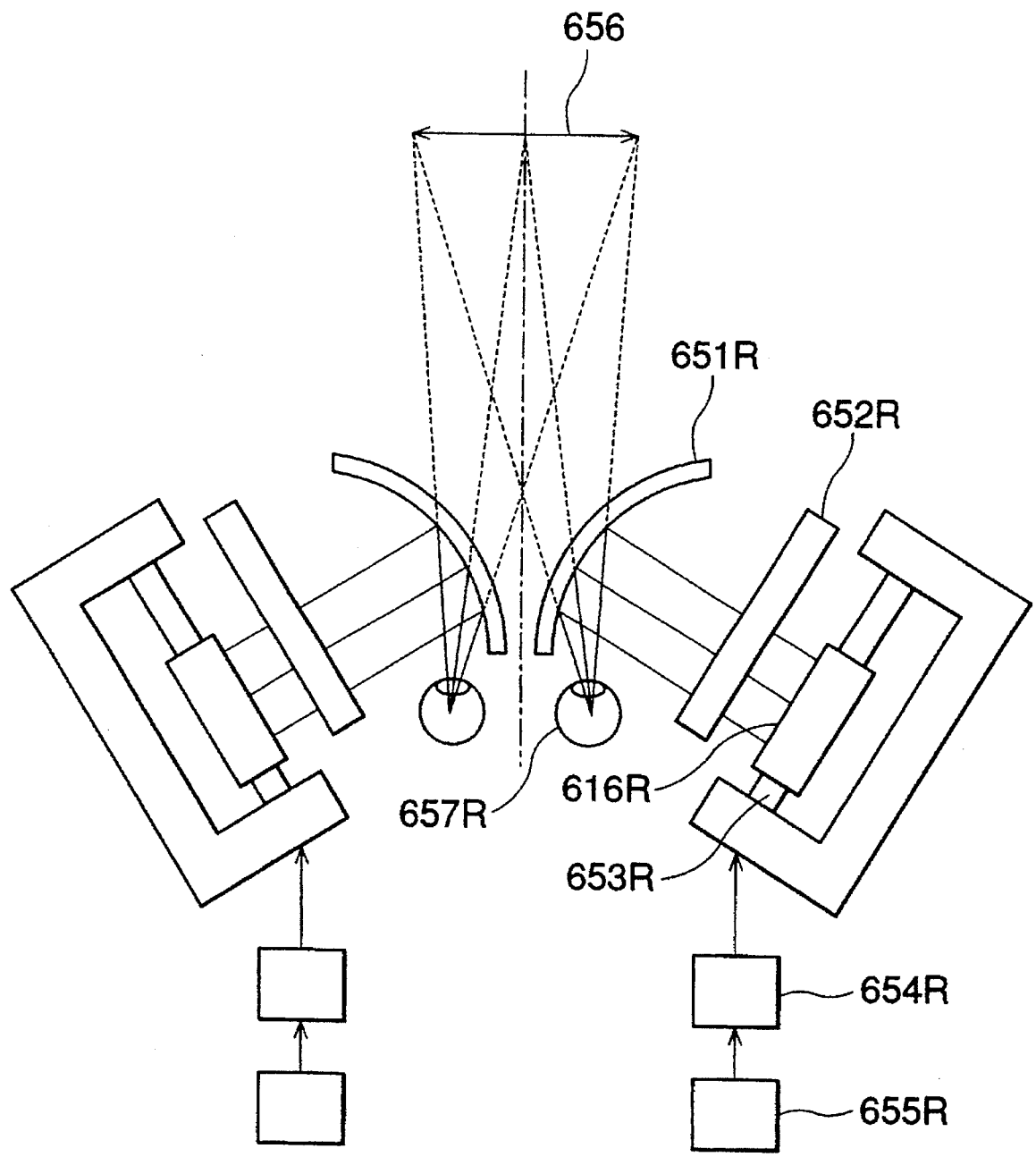
FIGS. 19 and 30 are schematic plan views for explaining the display apparatus upon reception of, e.g., the NTSC signal.
Figure 20:
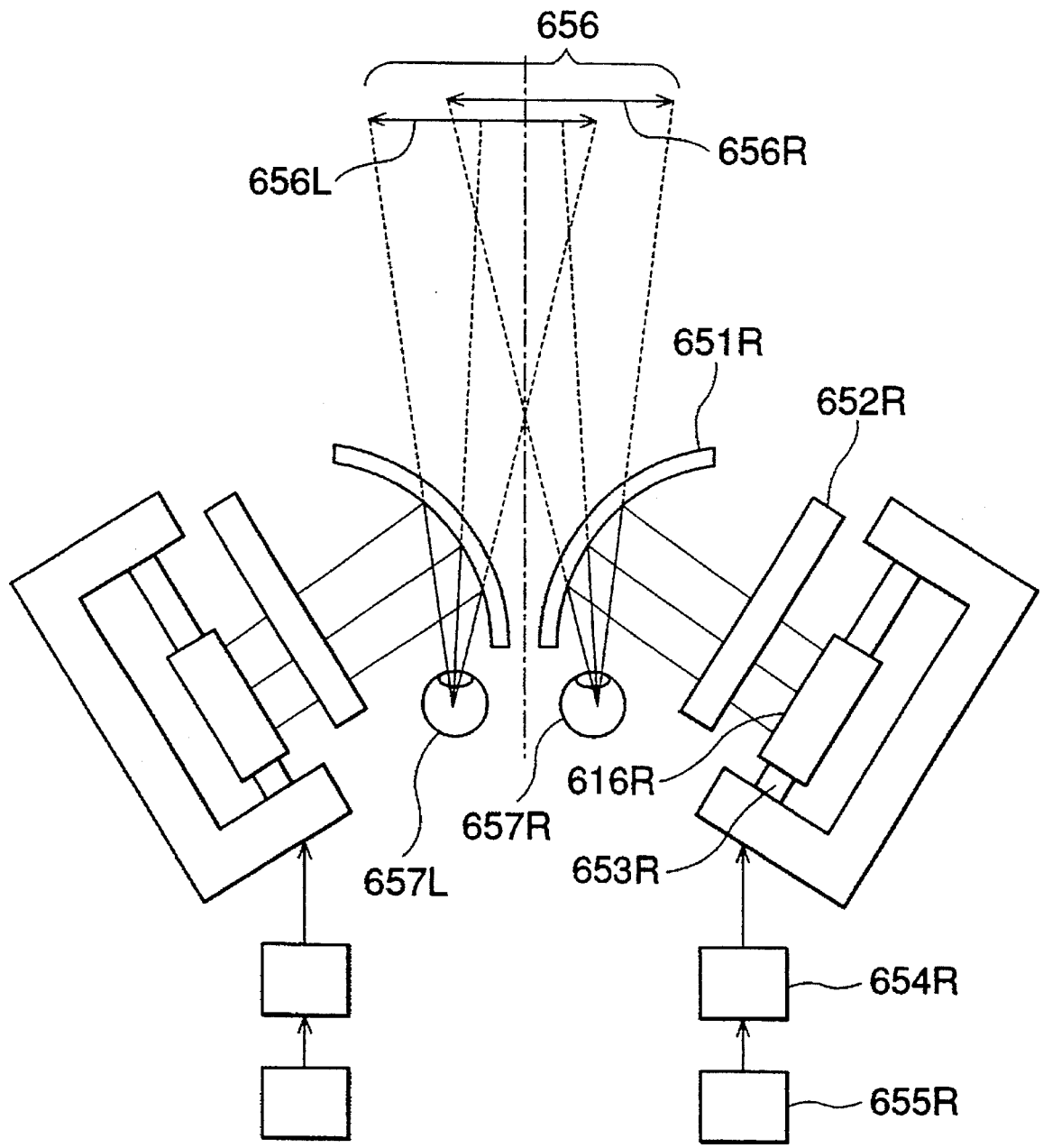
FIGS. 20, 21, and 31 are schematic plan views for explaining the display apparatus upon reception of, e.g., the HDTV signal.

FIGS. 19 and 20 are plan views schematically showing the arrangement of a liquid crystal display apparatus according to a preferred embodiment of the present invention. Because of its symmetrical arrangement, reference numerals with a suffix "R" denote elements for a right eye in FIGS. 19 and 20, unless otherwise specified. As the block diagram and operation of the liquid crystal display apparatus according to this embodiment, those in the above-described first or second embodiment can be applied, and a detailed description thereof will be omitted.

Referring to FIGS. 19 and 20, in a system for each eye, a virtual image forming optical element 651 has a function of deflecting a light beam from a liquid crystal panel 616 in a direction of an eye 657 of a user, thereby forming an image displayed on a display unit as a virtual image in front. A relay optical system 652 is inserted to correct an aberration not sufficiently corrected by only the virtual image forming optical element 651 or intermediately focusing an optical object plane. An actuator 653 is used to move the liquid crystal panel 616. A driving circuit 654 controls the actuator 653. A control amount adjusting means 655 adjusts the control amount of the actuator 653. A to-be-displayed image is formed as a virtual image 656.

In this embodiment, when an image signal is an NTSC signal, identical image signals are displayed on both liquid crystal panels 616R and 616L. The virtual images are moved such that the right-eye virtual image and the left-eye virtual image are matched with each other, as shown in FIG. 19. When the image signal is an HDTV signal, the image signal is divisionally displayed on the liquid crystal panels 616R and 616L. The liquid crystal panel 616 is moved such that the right-eye virtual image and the left-eye virtual image partially overlap each other, as shown in FIG. 20.

In this manner, the virtual images of a to-be-displayed image, which are displayed on the two left- and right-eye liquid crystal panels, can be more fused into a natural image.

The liquid crystal display apparatus of this embodiment can also be applied to a display method as in the following description.

Seventh Embodiment

Figure 21:
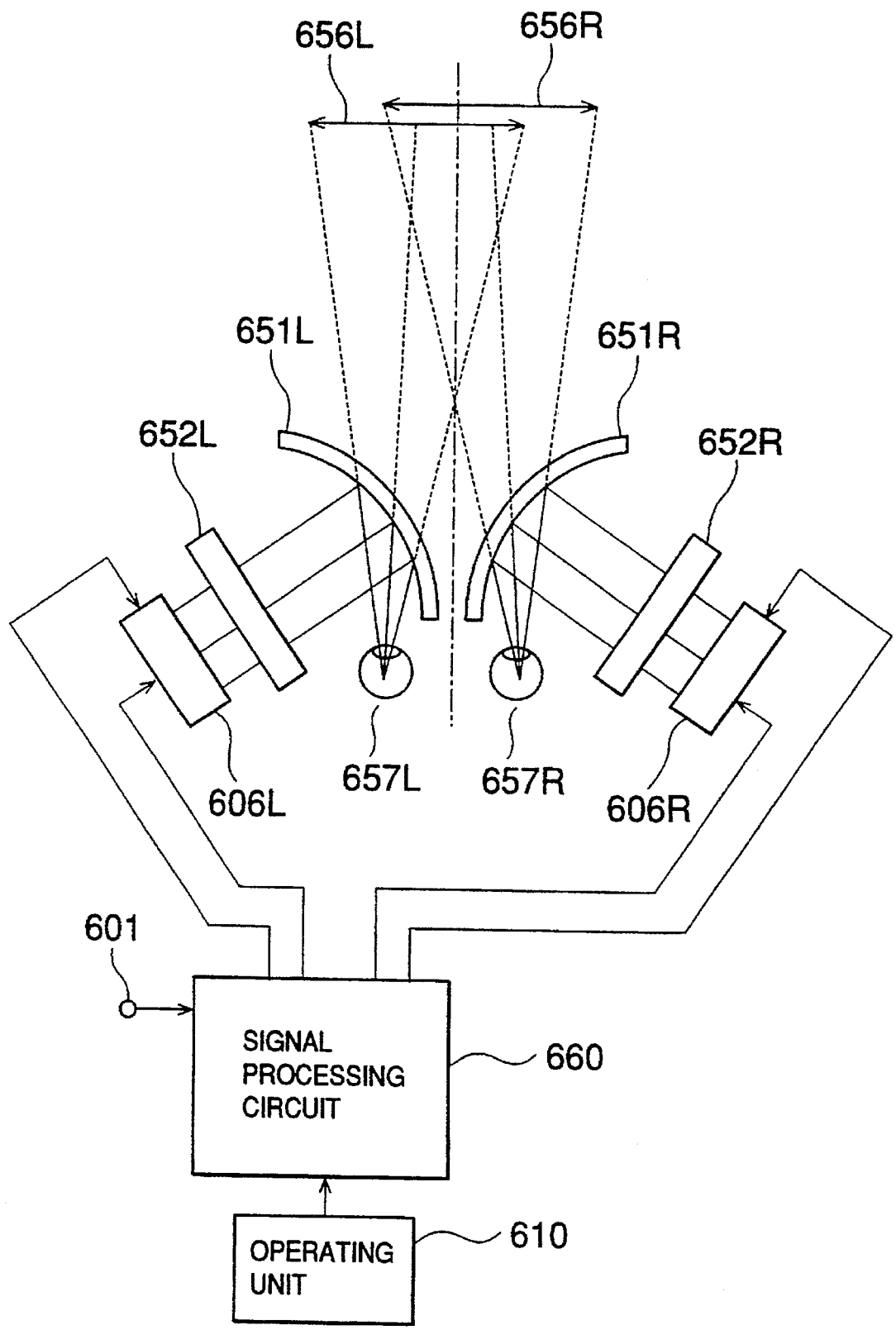

FIG. 21 is a view showing a preferred embodiment of the present invention. Referring to FIG. 21, an input terminal 601 receives an image signal. An operating unit 610 sets an aspect ratio. A signal processing circuit 660 serves as an aspect ratio converting means for converting the aspect ratio of the image signal input from the input terminal 601. Display units 606R and 606L display images and are constituted by liquid crystal displays with back light.

An image displayed on the display unit 606L is guided to a left eye 657L of an observer through a relay optical system 652L and a concave mirror 651L. The observer can recognize this image as a virtual image 656L enlarged in front.

Similarly, an image displayed on the display unit 606R is guided to a right eye 657R through a relay optical system 652R and a concave mirror 651R, and the observer can recognize a virtual image 656R. The display unit 606L, the relay optical system 652L, and the concave mirror 651L constitute a first display means, and the display unit 606R, the relay optical system 652R, and the concave mirror 651R constitute a second display means.

Figure 22:
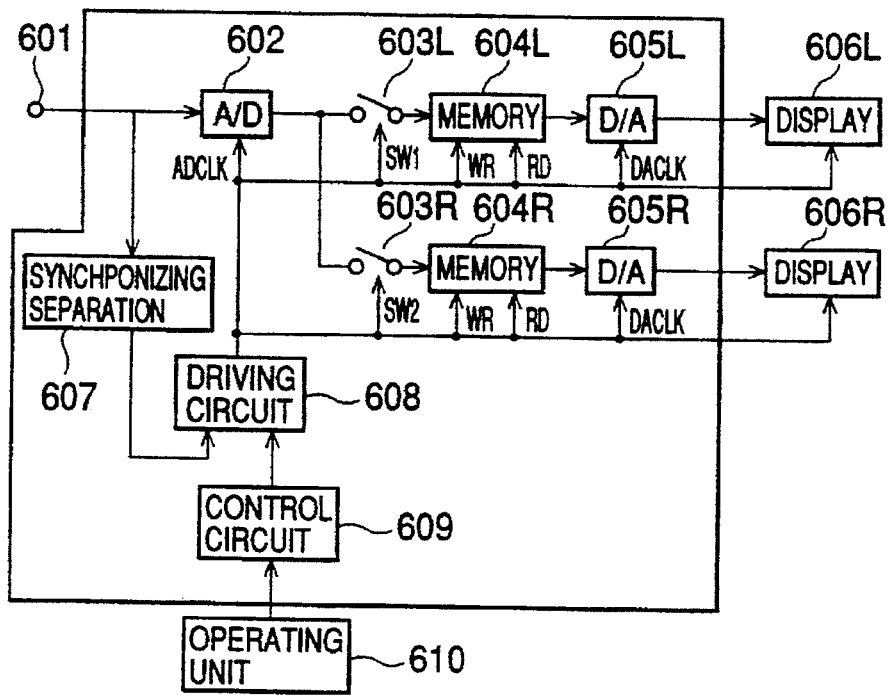

FIG. 22 is a schematic block diagram for explaining the signal processing circuit 660. Referring to FIG. 22, the signal processing circuit 660 includes the input terminal 601 for receiving an image signal, an A/D conversion circuit 602, switching circuits 603L and 603R, memories 604L and 604R, D/A conversion circuits 605L and 605R, and the display units 606L and 606R. The display unit 606L is arranged at a position visible to only the left eye while the display unit 606R is arranged at a position visible to only the right eye. The signal processing circuit 660 also includes a synchronizing separation circuit 607, a driving circuit 608, a control circuit 609, and the operating unit 610.

Figure 23A:
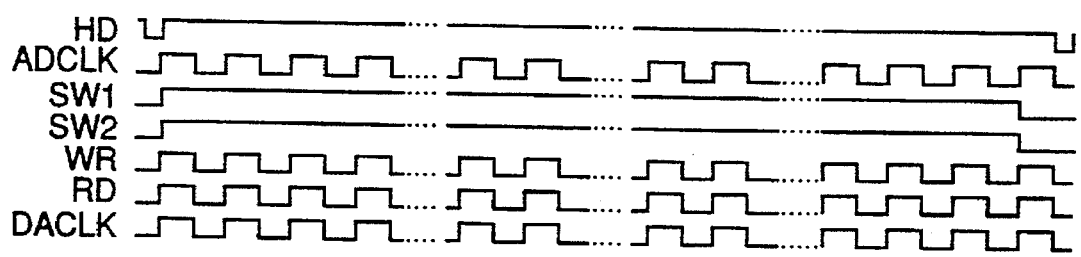
FIGS. 23A and 23B are timing charts for explaining a driving timing.
Figure 23B:
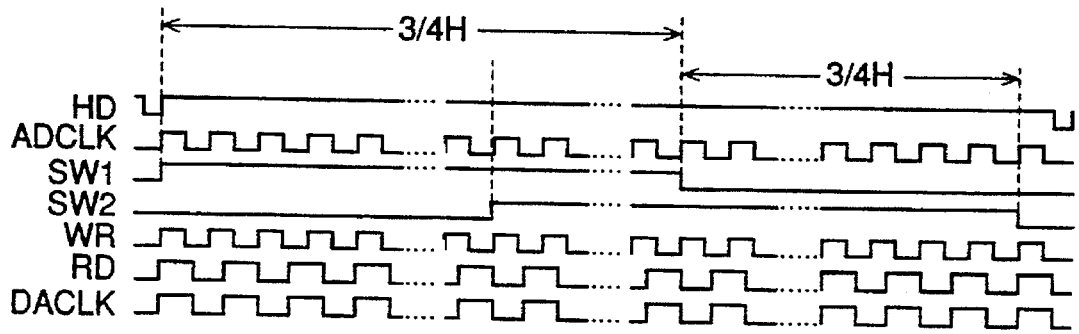

FIGS. 23A and 23B are timing charts showing the timings of driving pulses ADCLK, SW1, SW2, WR, RD, and DACLK for the circuits in the signal processing circuit 660.

The operation of the display apparatus according to the seventh embodiment will be described below with reference to FIGS. 21 to 23B.

In this embodiment, it is assumed that the aspect ratio of the screens of the display units 606L and 606R is 4:3, and the aspect ratio of an to-be-input image signal is 4:3. An operation of displaying the image signal at an aspect ratio of 4:3 and an operation of displaying the image signal converted to have an aspect ratio of 16:9 will be independently described.

Figure 24:
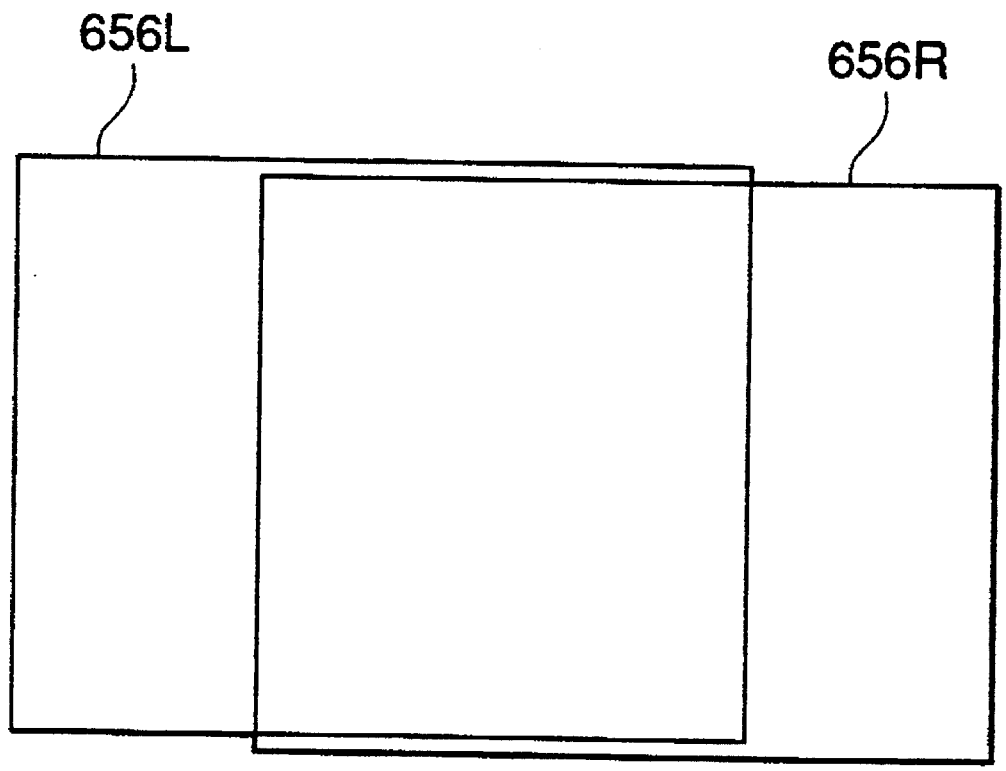

A positional relationship between the virtual images 656L and 656R in FIG. 21 is shown in FIG. 24. The virtual image 656L is displayed at the left portion of the screen having an aspect ratio of 16:9, and the virtual image 656R is displayed at the right portion. The two virtual images 656L and 656R overlap each other at the central portion.

When a mode for displaying an image at an aspect ratio of 4:3 is selected by the operating unit 610, the driving circuit 608 is controlled in accordance with a control signal from the control circuit 609 so as to supply driving pulses as shown in FIG. 23A to the circuits. An image signal input from the input terminal 601 is converted from an analog signal into a digital signal by the A/D conversion circuit 602 using the pulse ADCLK shown in FIG. 23A as a clock.

The switching circuits 603L and 603R are turned on when the control signals SW1 and SW2 are at high level. The control signals SW1 and SW2 at this time are shown in FIG. 23A. The switching circuits 603L and 603R are simultaneously turned on, and an output signal from the A/D conversion circuit 602 is written in the memories 604L and 604R in accordance with the pulse WR shown in FIG. 23A. Signals read out from the memories 604L and 604R in accordance with the pulse RD shown in FIG. 23A are converted from digital signals into analog signals by the D/A conversion circuits 605L and 605R using the pulse DACLK shown in FIG. 23A as a clock and supplied to the display units 606L and 606R, respectively.

Figure 25A:
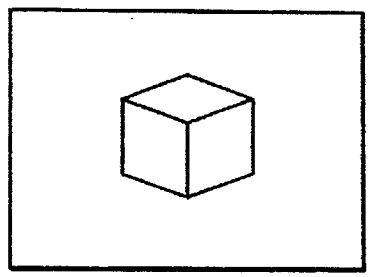
FIGS. 25A to 25C are views for explaining a display method for display at an aspect ratio equal to that of a display means.
Figure 25B:
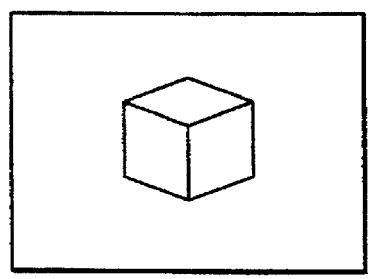
Figure 25C:
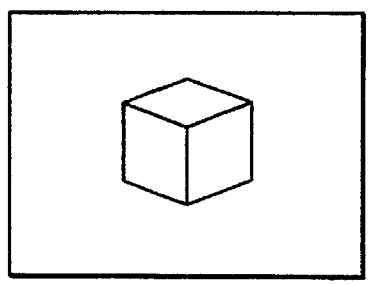

As for the timings of the driving pulses ADCLK, WR, RD, and DACLK, all the pulses have the same frequency as shown in FIG. 23A, so that identical images are displayed on the display units 606L and 606R. When the observer adjusts congestion of the identical images arranged as shown in FIG. 24, the images displayed on the left and right display units 606L and 606R as shown in FIGS. 25A and 25B are fused and recognized as an image having an aspect ratio of 4:3, as shown in FIG. 25C.

When a mode for displaying an image at an aspect ratio of 16:9 is selected by the operating unit 610, the driving circuit 608 is controlled in accordance with a control signal from the control circuit 609 so as to supply driving pulses as shown in FIG. 23B to the circuits. An image signal input from the input terminal 601 is converted from an analog signal into a digital signal by the A/D conversion circuit 602 using the pulse ADCLK shown in FIG. 23B as a clock. The control signals SW1 and SW2 at this time are shown in FIG. 23B. The control signal SW1 is at high level during a 3/4H interval including the first half of one horizontal scanning interval (1H). The control signal SW2 is at high level during a 3/4H interval including the last half of a 1H interval.

Figure 26A:
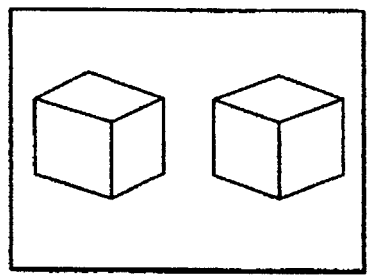
FIGS. 26A to 26C are views for explaining a display method for display at an aspect ratio larger (i.e., wider) than that of the display means.
Figure 26B:
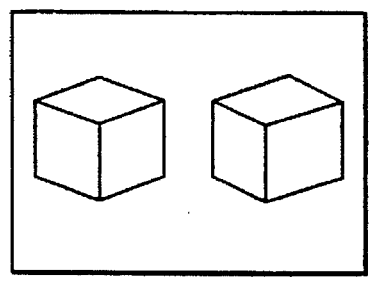
Figure 26C:
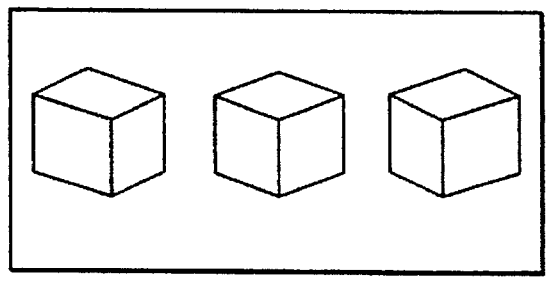

While the control signal SW1 is at high level, an output signal from the A/D conversion circuit 602 is written in the memory 604L in accordance with the pulse WR shown in FIG. 23B. While the control signal SW2 is at high level, an output signal from the A/D conversion circuit 602 is written in the memory 604R in accordance with the pulse WR shown in FIG. 23B. That is, an image is divided into left and right components and stored in the memories 604L and 604R. Signals read out from the memories 604L and 604R in accordance with the pulse RD in FIG. 23B are converted from digital signals into analog signals by the D/A conversion circuits 605L and 605R using the pulse DACLK shown in FIG. 23B as a clock and supplied to the display units 606L and 606R, respectively. As for the timings of the driving pulses ADCLK, WR, RD, DACLK, the frequencies of the pulses RD and DACLK are the same as those in the 4:3 mode, as shown in FIG. 23B. The frequencies of the pulses ADCLK and WR are 4/3 times those of the pulses RD and DACLK, so that the image is enlarged by 4/3 in the horizontal direction. This image is divisionally displayed on the left and right display units 606L and 606R. The images displayed on the left and right display units 606L and 606R, as shown in FIGS. 26A and 26B, are fused and recognized as an image having an aspect ratio of 16:9, as shown in FIG. 26C.

In this manner, a mode for displaying an image at an aspect ratio of 4:3 or a mode for displaying an image at an aspect ratio of 16:9 can be selected to display an image by using the two display units 606L and 606R having an aspect ratio of 4:3.

In this embodiment, a case has been described in which the display units 606L and 606R having an aspect ratio of 4:3 are used to display an image at an aspect ratio 4:3 or 16:9. However, the present invention is not limited to this aspect ratio. When a predetermined relationship is set between the frequencies of the driving pulses ADCLK, WR, RD, and DACLK to enlarge an image in the horizontal direction, the image can be displayed at an arbitrary aspect ratio, as a matter of course.

Also in this embodiment, an aspect ratio may be automatically selected in accordance with a signal, as in the sixth embodiment.

Eighth Embodiment

Figure 27:
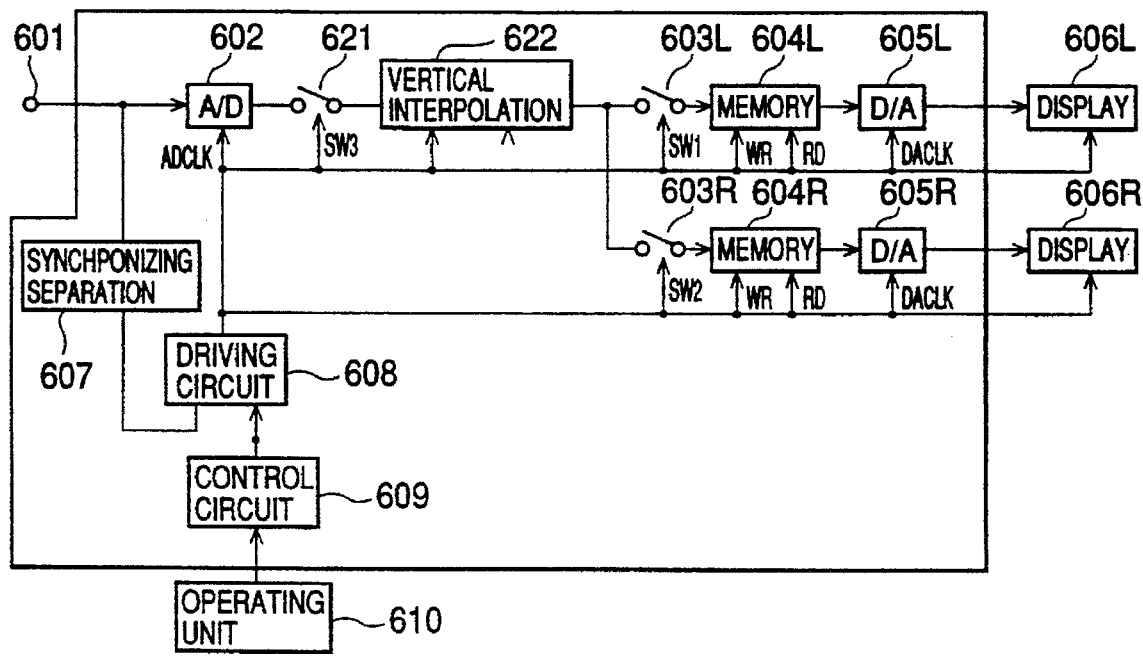

FIG. 27 is a block diagram showing a display apparatus according to another preferred embodiment of the present invention. The same reference numerals as in FIG. 22 denote the same constituent elements in FIG. 27, and a detailed description thereof will be omitted. Referring to FIG. 27, the display apparatus includes a switching circuit 621 and a vertical interpolation circuit 622.

Figure 28:
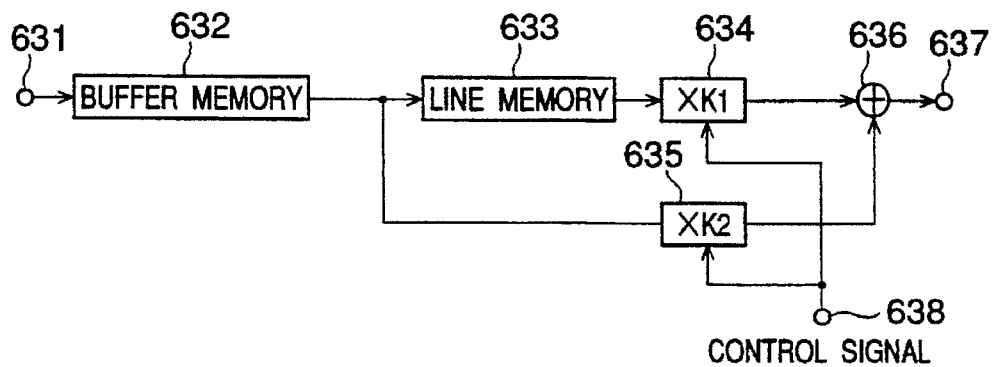
FIG. 28 is a schematic block diagram for explaining a vertical interpolation circuit.

FIG. 28 is a block diagram showing the structure of the vertical interpolation circuit 622. Referring to FIG. 28, the vertical interpolation circuit 622 includes an input terminal 631 for receiving an image signal, a buffer memory 632, a line memory 633, multipliers 634 and 635, an adder 636, an output terminal 637 for outputting an image signal, and an input terminal 638 for receiving a control signal from a control circuit 609.

FIGS. 29A to 29D are views for explaining the operation of the vertical interpolation circuit 622. The timings of driving pulses are the same as those shown in FIGS. 23A and 23B. A control signal SW3 will be described later.

The operation of this embodiment will be described with reference to FIGS. 27 to 29D. Also in this embodiment, it is assumed that the aspect ratio of display units 606L and 606R is 4:3, and the aspect ratio of a to-be-input image signal is also 4:3. An operation of displaying the image signal at an aspect ratio of 4:3 and an operation for displaying the image signal at an aspect ratio of 16:9 will be independently described.

When a mode for displaying an image at an aspect ratio of 4:3 is selected by an operating unit 610, a driving circuit 608 is controlled in accordance with a control signal from the control circuit 609, which is input from the input terminal 638, so as to supply driving pulses as shown in FIG. 23A to the circuits. An image signal input from the input terminal 601 is supplied to a switching circuit 621. The switching circuit 621 is turned on when the control signal SW3 is at high level. The control signal SW3 is always at high level, and the image signal is always supplied to the vertical interpolation circuit 622 and stored in the buffer memory 632.

Figure 29A:
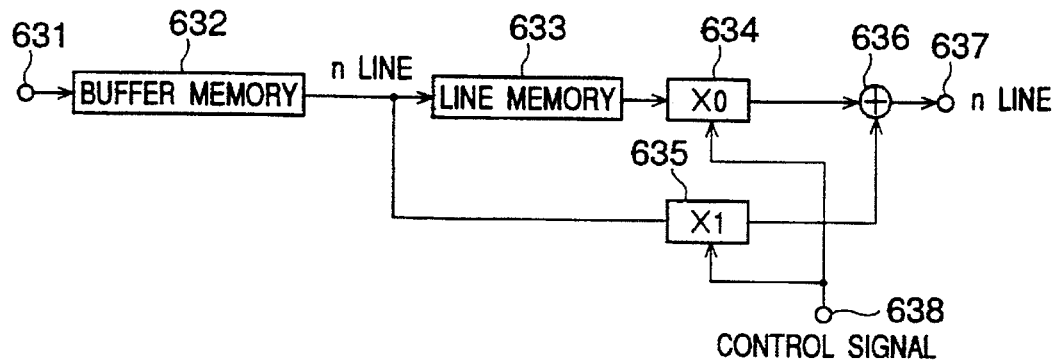
FIGS. 29A to 29D are views for explaining the operation of the vertical interpolation circuit.
Figure 29B:
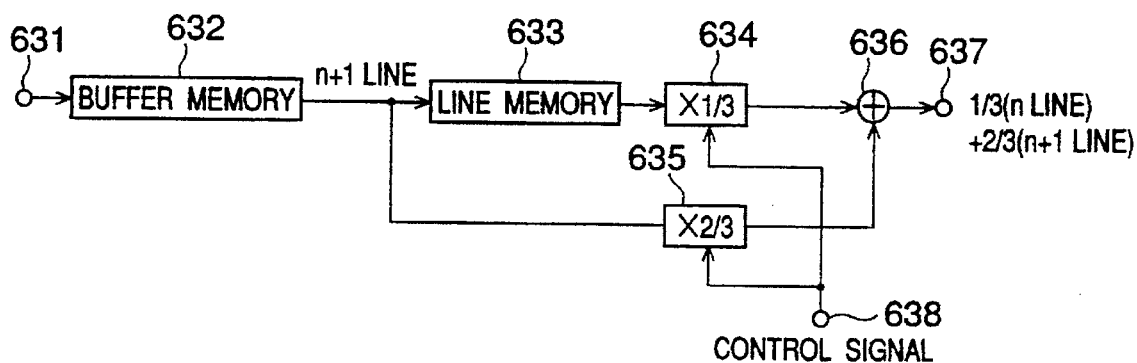
Figure 29C:
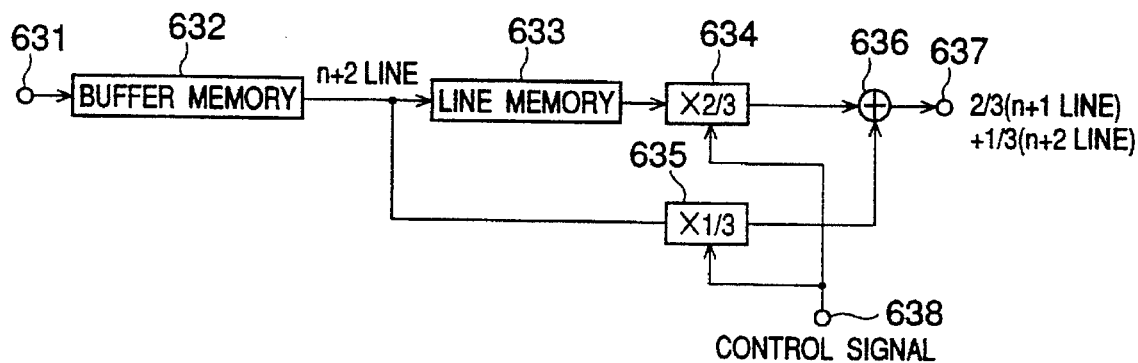
Figure 29D:
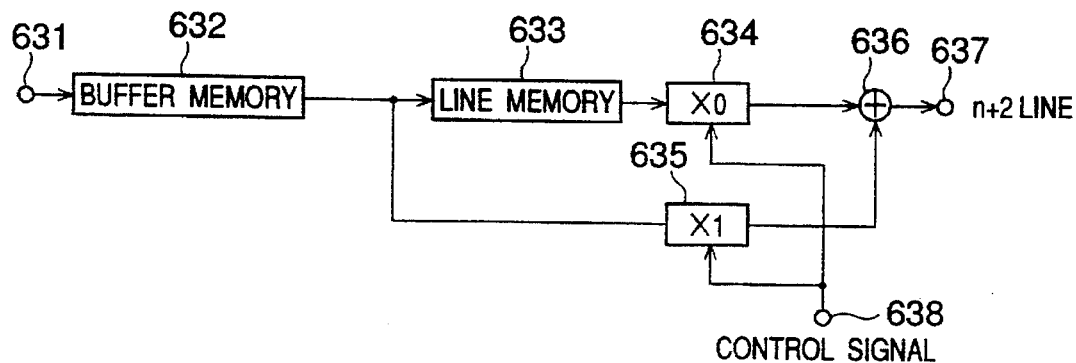

Coefficients K1 and K2 of the multipliers 634 and 635 are set as K1=0 and K2=1, as shown in FIG. 29A, in accordance with a control signal from the control circuit 609, which is input from the input terminal 638. Therefore, the input image signal is output to the output terminal 637. The operation in FIG. 29A is repeated for subsequent lines. An operation subsequent to that of the vertical interpolation circuit 622 is the same as that in FIG. 22, and identical images are displayed on the display units 606L and 606R. With this operation, the images displayed on the left and right display units 606L and 606R, as shown in FIGS. 25A and 25B, are fused and recognized as an image having an aspect ratio 4:3 as shown in FIG. 25C.

When a mode for displaying an image at an aspect ratio of 16:9 is selected by the operating unit 610, the driving circuit 608 is controlled in accordance with a control signal from the control circuit 609 so as to supply the driving pulses as shown in FIG. 23B to the circuits. An image signal input from the input terminal 601 is supplied to the switching circuit 621. The control signal SW3 is at low level during an interval of the first 60 lines of an effective scanning interval of 480 lines, at high level during an interval of the subsequent 360 lines, and at low level during an interval of the last 60 lines. Therefore, an image signal corresponding to the 360 lines at the central portion of the screen is supplied to the vertical interpolation circuit 622 while the upper and lower portions of the screen are trimmed by 60 lines, respectively. The vertical interpolation circuit 622 linearly interpolates the image signal corresponding to the 360 lines in the vertical direction to multiple the number of lines of the image signal by 4/3, thereby obtaining 480 lines.

The operation of the vertical interpolation circuit 622 will be described below with reference to FIGS. 29A to 29D. An image signal input from the input terminal 631 is temporarily stored in the buffer memory 632. When a signal of the nth line is read out from the buffer memory 632, the readout signal is stored in the line memory 633 and at the same time input to the multiplier 635. At this time, the coefficients of the multipliers 634 and 635 are set as K1=0 and K2=1, as in FIG. 29A, in accordance with a control signal from the input terminal 638. Outputs from the multipliers 634 and 635 are added by the adder 636 and output to the output terminal 637. Therefore, in FIG. 29A, the image signal of the nth line is output to the output terminal 637.

When a signal of (n+1)th line is read out from the buffer memory 632 during the next 1H interval, the readout signal is supplied to the line memory 633 and the multiplier 635. At the same time, the signal of the nth line, which is stored an interval of 1H before the interval of the (n+1)th line, is read out from the line memory and supplied to the multiplier 634. At this time, the coefficients of the multipliers 634 and 635 are set as K1=1/3 and K2=2/3, as in FIG. 29B, in accordance with a control signal from the input terminal 638. Outputs from the multipliers 634 and 635 are added by the adder 636 and output to the output terminal 637. Therefore, in FIG. 29B, an image signal output to the output terminal 637 is represented as follows:

1/3(nth line)+2/3((n+1)th line)

When a signal of the (n+2)th line is read out from the buffer memory 632 during the next 1H interval, the readout signal is supplied to the line memory 633 and the multiplier 635. At the same time, the signal of the (n+1)th line, which is stored an interval of 1H before the interval of the (n+2)th line, is read out from the line memory 633 and supplied to the multiplier 634. At this time, the coefficients of the multipliers 634 and 635 are set as K1=2/3 and K2=1/3, as in FIG. 29C, in accordance with a control signal from the input terminal 638. Outputs from the multipliers 634 and 635 are added by the adder 636 and output to the output terminal 637. Therefore, in FIG. 29C, an image signal output to the output terminal 637 is represented as follows:

2/3((n+1)th line)+1/3((n+2)th line)

During the next 1H interval, no signal is read out from the buffer memory 632. The signal of the (n+2)th line, which is stored an interval of 1H before the interval of the (n+1)th line, is read out from the line memory 633 and supplied to the multiplier 634. At this time, the coefficients of the multipliers are set as K1=1 and K2=0, as in FIG. 29D, in accordance with a control signal from the input terminal 638.

Outputs from the multipliers 634 and 635 are added by the adder 636 and output to the output terminal 637. Therefore, in FIG. 29D, the image signal of the (n+2)th line is output to the output terminal 637.

By repeating this operation, the vertical interpolation circuit 622 can linearly interpolate an image signal corresponding to 360 lines in the vertical direction and output a signal corresponding to 480 lines as 4/3 times the number of lines of the image signal. An operation subsequent to that of the vertical interpolation circuit 622 is the same as that in the seventh embodiment. The image is enlarged by 4/3 in the horizontal direction and divisionally displayed on the left and right display units 606L and 606R. With this operation, the images displayed on the left and right display units 606L and 606R, as shown in FIGS. 26A and 26B, are fused and recognized as an image having an aspect ratio of 16:9, as shown in FIG. 26C.

In this manner, a mode for displaying an image at an aspect ratio of 4:3 or a mode for displaying an image at an aspect ratio of 16:9 can be selected and displayed using the two display units 606L and 606R having an aspect ratio of 4:3, as in the seventh embodiment. In the seventh embodiment, since an image is enlarged in only the horizontal direction to convert the aspect ratio, the image is enlarged in the horizontal direction. In this embodiment, however, an image is enlarged in both the horizontal and vertical directions, so that the aspect ratio can be converted without causing distortion of the image.

In this embodiment, a case has been described in which the display units 606L and 606R having an aspect ratio of 4:3 are used to display an image at an aspect ratio of 4:3 or 16:9. However, the present invention is not limited to this aspect ratio. When the image is enlarged in the vertical direction by vertical interpolation, and a predetermined relationship is set between the frequencies of the driving pulses ADCLK, WR, RD, and DACLK to enlarge the image in the vertical direction, the image can be displayed at an arbitrary aspect ratio, as a matter of course.

Ninth Embodiment

The ninth embodiment of the present invention will be described below.

In the above-described seventh and eighth embodiments, left and right images are naturally fused for an image displayed at an aspect ratio of 16:9. However, for an image displayed at an aspect ratio of 4:3, congestion adjustment is necessary. For this reason, a problem is expected such that some people cannot fuse the images or suffer eye fatigue even if the images can be fused. The ninth embodiment has as its object to solve this problem and realizes a display apparatus for facilitating fusion of images for an image displayed at either aspect ratio and minimizing eye fatigue.

Figure 30:
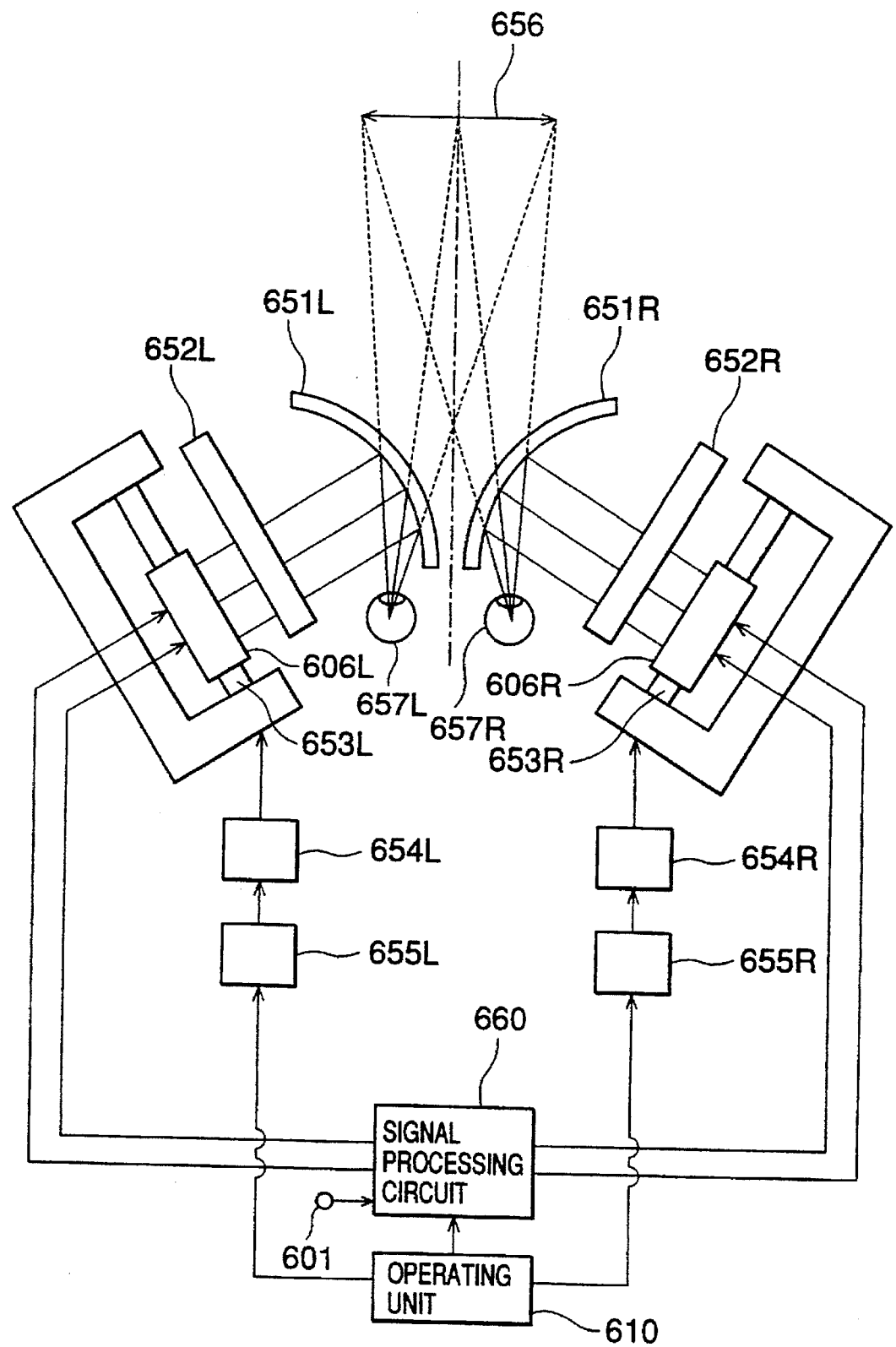
Figure 31:
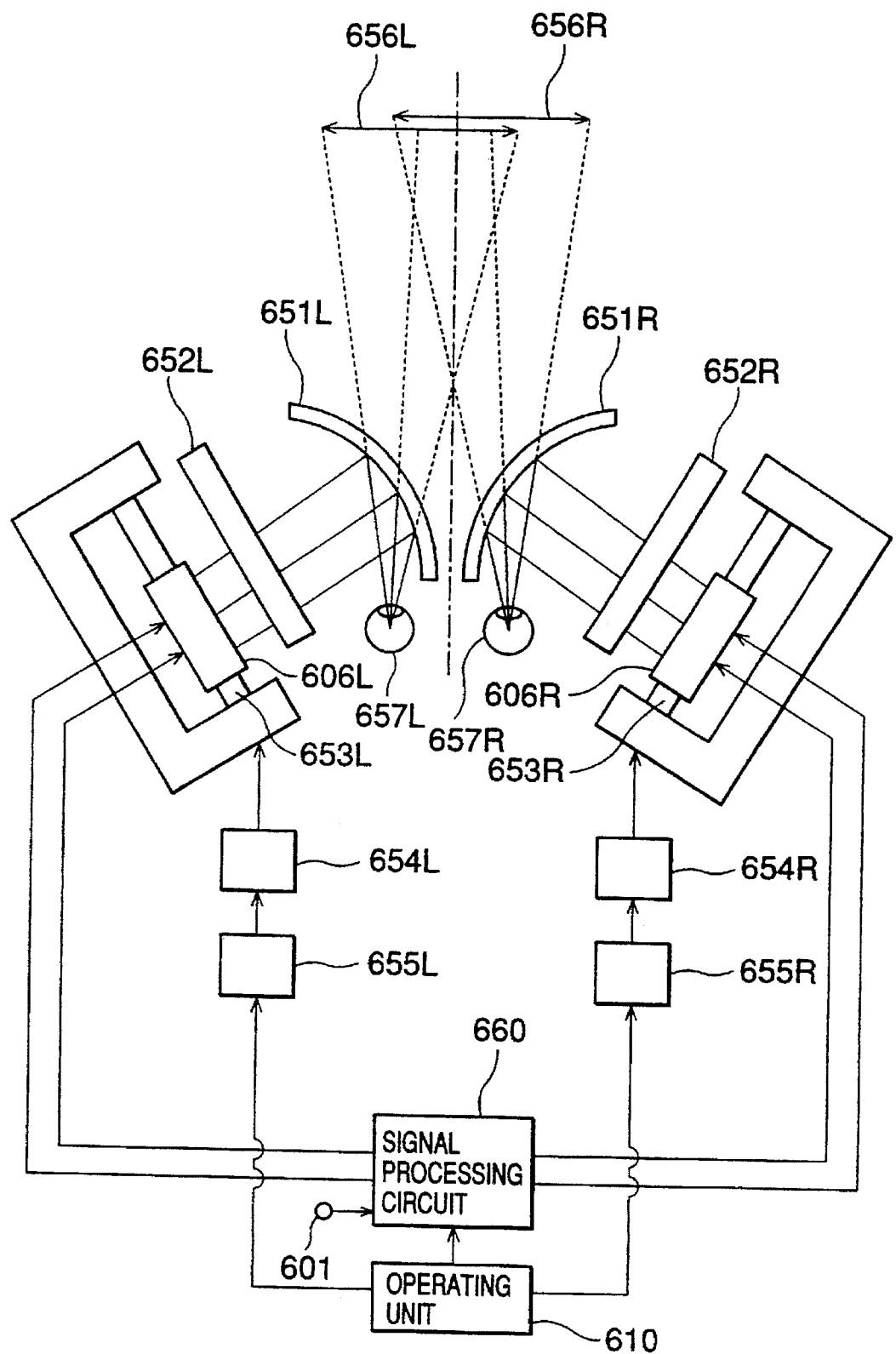

FIGS. 30 and 31 are plan views showing a display apparatus according to the ninth embodiment of the present invention. The block diagram showing the circuit arrangement of the display apparatus according to this embodiment and the operation thereof are the same as those in the seventh and eighth embodiments, and a detailed description thereof will be omitted.

Referring to FIGS. 30 and 31, virtual image forming optical elements 651R and 651L have a function of deflecting light beams from display units 616R and 616L in directions of the eyes of an observer, thereby forming images displayed on the display units 606R and 606L as virtual images in front. Relay optical systems 652R and 652L are inserted to correct an aberration not sufficiently corrected by only the virtual image forming optical elements 651R and 651L or intermediately focusing optical object plane. Actuators 653R and 653L are used to move the display units 616R and 616L. Driving circuits 654R and 654L control the actuators 653R and 653L. Control amount adjusting means 655R and 655L adjust the control amounts of the actuators 653R and 653L. A to-be-displayed image is formed as a virtual image 656.

In this embodiment, when a mode for displaying an image at an aspect ratio of 4:3 is selected by an operating unit 610, an image signal input from an input terminal 601 is processed by a signal processing circuit 660 as in the seventh and eighth embodiments. Identical image signals are displayed on both the display units 606R and 606L. A signal from the operating unit 610 is transmitted to the control amount adjusting means 655R and 655L to move the display units 606L and 606R to predetermined positions such that the right- and left-eye virtual images are spatially matched with each other, as shown in FIG. 30. The right and left eyes of the observer receive the images displayed on the right and left display units 606R and 606L, as shown in FIGS. 25A and 25B. These images are fused and recognized as an image having an aspect ratio of 4:3, as shown in FIG. 25C.

When a mode for displaying an image at an aspect ratio of 16:9 is selected by the operating unit 610, the aspect ratio of a to-be-displayed image is converted into 16:9 by the signal processing circuit 660. This image signal is divisionally displayed on the left and right display units 606L and 606R. As shown in FIG. 31, a signal from the operating unit 610 is transmitted to the control amount adjusting means 655L and 655R to move the display units 606L and 606R to predetermined positions such that the right- and left-eye virtual images partially overlap each other, as shown in FIG. 24. The observer receives images displayed on the left and right display units 606L and 606R, as shown in FIGS. 26A and 26B. These images are fused and recognized as an image having an aspect ratio of 16:9, as shown in FIG. 26C.

In this embodiment, an image having a converted aspect ratio can be observed, as in the above embodiments. In addition, in accordance with an aspect ratio, the positions of the virtual images of the images displayed on the two left- and right-eye display units 606L and 606R are moved to positions where these images are naturally fused. Therefore, the observer can naturally receive and fuse the images while minimizing eye fatigue.

The means for moving the position of the virtual image is not limited to that shown in this embodiment in which the both display units 606L and 606R are moved. This means can also be realized by moving only one of the display units, slightly inclining the concave mirrors 651L and 651R, or moving the relay optical systems.

As has been described above, according to the present invention, there is provided a display apparatus and method in which display means having a predetermined aspect ratio are used to display image information having an arbitrary aspect ratio without forming any non-display portion.

In addition, according to the present invention, there is also provided a display apparatus and method in which display means for displaying images having a small aspect ratio such as the NTSC or PAL system are used to display an image on the entire screen independently of the aspect ratio.

Furthermore, according to the present invention, images having different aspect ratios can be excellently displayed independently of the aspect ratios without degrading the image quality including image reproducibility, e.g., resolution and sharpness inherent to the display means.

According to the present invention, an image signal input terminal for receiving an image signal, a discriminating means for determining whether the input image signal is a signal of a first system having a first aspect ratio, e.g., the NTSC or PAL system having an aspect ratio of 4:3 or a signal of a second system having a second aspect ratio different from the first aspect ratio, e.g., the HDTV system having an aspect ratio of 16:9, and two display means having the first aspect ratio of, e.g., 4:3, each of which is visible to only a right or left eye are provided. When the discriminating means discriminates the input signal as a signal of the first system, identical image signals are displayed on the left and right display means by interlaced scanning. When the discriminating means discriminates the input signal as a signal of the second system, the image signal is divisionally displayed on the left and right display means by non-interlaced scanning. With this operation, an image signal having the first aspect ratio of, e.g., 4:3 is displayed, and at the same time, an HDTV signal having the second aspect ratio of, e.g., 16:9 can also be displayed using an inexpensive display apparatus of the conventional NTSC or PAL system having the first aspect ratio of, e.g., 4:3.

According to the present invention, when the discriminating means discriminates the input signal as a signal of the first system such as the NTSC or PAL system, identical image signals are displayed on the left and right display units by two-line simultaneous write access, thereby reducing flicker caused due to interlaced scanning.

In addition, according to the present invention, there is provided a liquid crystal display apparatus comprising an image signal input terminal for inputting an image signal, a discriminating means for determining whether the input image signal is a signal of a first system having a first aspect ratio, e.g., the NTSC or PAL system having an aspect ratio of 4:3 or a signal of a second system having a second aspect ratio, e.g., a signal of the HDTV system having an aspect ratio of 16:9, two liquid crystal display units each visible to only a right or left eye and having the first aspect ratio of, e.g., 4:3, a storage means for storing the image signal to be displayed on the right-eye liquid crystal display unit, and a storage means for storing the image signal to be displayed on the left liquid crystal display unit. When the discriminating means discriminates the input signal as a signal of the first system, identical image signals are displayed on the left and right display units by two-line simultaneous write access. When the discriminating means discriminates the input signal as a signal of the second system, the image signal is divisionally displayed on the left and right display units by non-interlaced scanning. With this operation, an image signal having an aspect ratio of 4:3 can be displayed, and at the same time, an HDTV signal having the different second aspect ratio of, e.g., 16:9 can also be displayed using an inexpensive liquid crystal display apparatus of the NTSC or PAL system having an aspect ratio of 4:3.

Furthermore, according to the present invention, when the discriminating means discriminates the input signal as a signal of the first system, a signal for interpolating the signal of one of two lines in the vertical direction is written, thereby reducing fold-over distortion in the vertical direction.

According to the present invention, even when the discriminating means discriminates the input signal as a signal of the second system, the image signal is elongated to the rate of the first system, e.g., the NTSC rate as the function of time and supplied to the liquid crystal panel, thereby equalizing the driving frequency for horizontal scanning of the liquid crystal panel with that in the first system.

According to the present invention, the aspect ratio of input image information is converted to a set aspect ratio by using an aspect ratio converting means, and the image information having the converted aspect ratio is divisionally displayed on two display means. With this arrangement, the image information can be displayed at an arbitrary aspect ratio by using a display means having a predetermined aspect ratio without forming any non-display portion on the display means.

According to the present invention, input image information is enlarged in the horizontal direction by using an aspect ratio converting means to convert its aspect ratio into a set aspect ratio. The image information having the converted aspect ratio is divisionally displayed on two display means. With this arrangement, the image information can be displayed at an arbitrary aspect ratio by using display means having a predetermined aspect ratio without forming any non-display portion on the display means.

According to the present invention, input image information is enlarged in the horizontal direction by using an aspect ratio converting means, and at the same time image information corresponding to a predetermined number of lines is enlarged in the vertical direction, thereby converting its aspect ratio into a set aspect ratio. The image information having the converted aspect ratio is divisionally displayed on two display means. With this arrangement, the image information can be displayed at an arbitrary aspect ratio by using display means having a predetermined aspect ratio without forming any non-display portion on the display means. At the same time, the image information having the converted aspect ratio can be displayed without distortion of the to-be-displayed image information upon enlargement in the horizontal and vertical directions.

According to the present invention, the aspect ratio of the image information is converted, and the image information having the converted aspect ratio is divisionally displayed on left- and right-eye display means. At the same time, the position of the virtual image of a to-be-displayed image is moved by a virtual image moving means in accordance with the aspect ratio of the to-be-displayed image. With this arrangement, an observer can more naturally fuse the left and right virtual images.

The present invention is not limited to the above embodiments, and various changes and modifications can be made within the spirit and scope of the invention.

Therefore, the aspect ratio of 16:9 in the above description is not limited to this, and the image is not necessarily based on an HDTV signal. An image having an aspect ratio of 4:3 any or other aspect ratio may be converted into a signal having a desired aspect ratio of, e.g., 16:9 and displayed. A type of signal (NTSC, PAL, HDTV, or the like) is not limited as long as an image having the second aspect ratio wider than the first aspect ratio is displayed on the display means having the first aspect ratio (i.e., the second aspect ratio is larger than the first aspect ratio in the horizontal direction).

What is claimed is:

1. A display apparatus comprising:
    an image signal input terminal for receiving an image signal;
    discriminating means for determining whether the input image signal is a signal of a first system for displaying an image at a first aspect ratio or a signal of a second system for displaying the image at a second aspect ratio larger than the first aspect ratio;
    first display means for the first aspect ratio, for displaying the image according to the input image signal at a position visible to only a right eye;
    second display means for the first aspect ratio, for displaying the image according to the input image signal at a position visible to only a left eye; and
    driving means for displaying identical images formed by the input image signal on said first and second display means when said discriminating means discriminates the input image signal as the signal of the first system, and divisionally displaying the image formed by the input image signal on the left and right display means when said discriminating means discriminates that the input signal is the signal of the second system.

2. An apparatus according to claim 1, wherein the first aspect ratio is 4:3, and the second aspect ratio is 16:9.

3. An apparatus according to claim 1, wherein the first system is one of NTSC and PAL systems, and the second system is an HDTV system.

4. An apparatus according to claim 1, further comprising an optical system including an optical element for forming image information displayed on said display means as virtual images.

5. An apparatus according to claim 4, further comprising virtual image moving means for moving at least one of positions where the virtual images are formed.

6. An apparatus according to claim 5, wherein said virtual image moving means moves the virtual image in accordance with a signal from said discriminating means.

7. An apparatus according to claim 1, wherein said driving means comprises:
    first horizontal scanning means for driving said two display means at a predetermined frequency in a horizontal direction;
    second horizontal scanning means for driving said two display means at a frequency higher than the driving frequency of said first horizontal scanning means in the horizontal direction;
    first vertical scanning means for driving said two display means by interlaced scanning;
    second vertical scanning means for driving said two display means by non-interlaced scanning; and
    display control means for displaying the identical images on said left and right display means by interlaced scanning upon driving said first and second display means by said first horizontal scanning means and said first vertical scanning means when said discriminating means discriminates the input signal as the signal of the first system, and divisionally displaying the image signal on said left and right display means by non-interlaced scanning upon driving said first and second display means by said second horizontal scanning means and said second vertical scanning means when said discriminating means discriminates the input signal as the signal of the second system.

8. An apparatus according to claim 7, wherein the aspect ratio of the first system is 4:3, and the aspect ratio of the second system is 16:9.

9. An apparatus according to claim 7, wherein the first system is one of NTSC and PAL systems, and the second system is an HDTV system.

10. An apparatus according to claim 7, further comprising an optical system including an optical element for forming image information displayed on said display means as virtual images.

11. An apparatus according to claim 10, further comprising virtual image moving means for moving at least one of positions where the virtual images are formed.

12. An apparatus according to claim 11, wherein said virtual image moving means moves the virtual image in accordance with a signal from said discriminating means.

13. An apparatus according to claim 1, wherein said driving means comprises:

first horizontal scanning means for driving said two display means at a predetermined frequency in a horizontal direction;

second horizontal scanning means for driving said two display means at a frequency higher than the driving frequency of said first horizontal scanning means in the horizontal direction;

third vertical scanning means for driving said two display means by two-line simultaneous write access;

second vertical scanning means for driving said two display means by non-interlaced scanning; and display control means for displaying the identical images on said left and right display means by two-line simultaneous write access upon driving said first and second display means by said first horizontal scanning means and said third vertical scanning means when said discriminating means discriminates the input signal as the signal of the first system, and divisionally displaying the image on said left and right display means by non-interlaced scanning upon driving said first and second display means by said second horizontal scanning means and said second vertical scanning means when said discriminating means discriminates the input signal as the signal of the second system.

14. An apparatus according to claim 13, wherein the aspect ratio of the first system is 4:3, and the aspect ratio of the second system is 16:9.

15. An apparatus according to claim 13, wherein the first system is one of NTSC and PAL systems, and the second system is an HDTV system.

16. An apparatus according to claim 13, further comprising an optical system including an optical element for forming image information displayed on said display means as virtual images.

17. An apparatus according to claim 16, further comprising virtual image moving means for moving at least one of positions where the virtual images are formed.

18. An apparatus according to claim 17, wherein said virtual image moving means moves the virtual image in accordance with a signal from said discriminating means.

19. An apparatus according to claim 1, further comprising first storage means for storing the image signal to be displayed on said first liquid crystal display unit, and second storage means for storing the image signal to be displayed on said second liquid crystal display unit.

20. An apparatus according to claim 1, further comprising a processing circuit, having first and second storage means for storing the image signal, for storing the identical image signals in said first and second storage means when said discriminating means discriminates the image signal having the first aspect ratio, and storing different images in said first and second storage means when the image signal has the second aspect ratio.

21. An apparatus according to claim 20, wherein said driving means comprises:

first horizontal scanning means for driving said first and second liquid crystal display units at a predetermined frequency in a horizontal direction;

second horizontal scanning means for driving said first and second liquid crystal display units at a frequency higher than the driving frequency of said first horizontal scanning means in the horizontal direction;

first vertical scanning means for driving said liquid crystal display units by two-line simultaneous write access; and second vertical scanning means for driving said liquid crystal display units by non-interlaced scanning, and the identical image signals are displayed on said left and right liquid crystal display units by two-line simultaneous write access upon driving said first and second liquid crystal display units by said first horizontal scanning means and said first vertical scanning means when said discriminating means discriminates the input signal as the signal of the first system, and the image signal is divisionally displayed on said left and right liquid crystal display units by non-interlaced scanning upon driving said first and second liquid crystal display units by said second horizontal scanning means and said second vertical scanning means when said discriminating means discriminates the input signal as the signal of the second system.

22. An apparatus according to claim 21, wherein said driving means further comprises interpolation means for generating an interpolation signal from the image signals input to said first and second storage means and the image signals read out from said storage means, and said interpolation means, so that the image signals read out from said first and second storage means and an image signal output from said interpolation means are displayed by two-line simultaneous write access when said discriminating means discriminates the input signal as the signal of the first system.

23. An apparatus according to claim 1, wherein said driving means comprises:

first writing means for writing the image signal in said storage means at a predetermined frequency;

second writing means for writing the image signal in said storage means at a frequency higher than the frequency of the first writing means;

reading means for reading out the image signal from said storage means at the same frequency as that of the first writing means;

horizontal scanning means for driving said liquid crystal display units at a predetermined frequency in a horizontal direction;

first vertical scanning means for driving said liquid crystal display units by two-line simultaneous write access; and second vertical scanning means for driving said liquid crystal display units by non-interlaced scanning, the image signal is written in said storage means by said first writing means and the image signal read out from said storage means by said reading means is displayed on the left and right liquid crystal display units by the two-line simultaneous write access upon driving said first and second liquid crystal display units by said horizontal scanning means and said first vertical scanning means when said discriminating means discriminates the input signal as the signal of the first system, and the image signal is written in said storage means by said second writing means, and the image signal read out from said reading means is divisionally displayed on the left and right liquid crystal display units upon driving said first and second liquid crystal display units by said horizontal scanning means and said second vertical scanning means when said discriminating means discriminates the input signal as the signal of the second system.

24. A display apparatus comprising:

first display means for displaying image information at a position visible to only a right eye;

second display means for displaying the image information at a position visible to only a left eye;

operating means for setting an aspect ratio for display of the image information; and aspect ratio converting means for converting the aspect ratio of the input image information into the aspect ratio set by said operating means and divisionally supplying the image information having the converted aspect ratio to said first and second display means.

25. An apparatus according to claim 24, further comprising aspect ratio converting means for enlarging the input image information in a horizontal direction to convert the aspect ratio of the image information into the aspect ratio set by said operating means and divisionally supplying the image information having the converted aspect ratio to said first and second display means.

26. An apparatus according to claim 24, further comprising an aspect ratio converting means for enlarging the input image information in a horizontal direction and at the same time enlarging image information corresponding to a predetermined number of lines in a vertical direction to convert the aspect ratio of the image information into the aspect ratio set by said operating means and divisionally supplying the image information having the converted aspect ratio to said first and second display means.

27. An apparatus according to claim 24, further comprising an optical system including an optical element for forming the image information displayed on said first and second display means as virtual images.

28. An apparatus according to claim 27, further comprising virtual image moving means for moving at least one of positions where the virtual images are formed in accordance with the aspect ratio set by said operating means.

29. A display method operative in an apparatus having first display means having a first aspect ratio and visible only to a right eye and second display means having the first aspect ratio and visible only to a left eye, said method comprising the steps of inputting an image signal having a second aspect ratio different from the first aspect ratio to the first display means and to the second display means, and divisionally displaying the image signal on the first and second display means.

30. A method according to claim 29, wherein the image signals divisionally displayed on the first and second display means are displayed while at least partially overlapping each other on the first and second display means.

31. A method according to claim 29, wherein the second aspect ratio is larger than the first aspect ratio in a horizontal direction.

* * * * *

UNITED STATES PATENT AND TRADEMARK OFFICE
CERTIFICATE OF CORRECTION

PATENT NO. : 5,657,034
DATED : August 12, 1997
INVENTOR(S) : YASUYUKI YAMAZAKI

It is certified that error appears in the above-identified patent and that said Letters Patent is hereby corrected as shown below:

ON TITLE PAGE

[54] Title: "RATIOS" should read --RATIOS FOR--.

COLUMN 1

Line 3, "RATIOS" should read --RATIOS FOR--.

COLUMN 14

Line 57, "an" should read --a--.

COLUMN 17

Line 20, "multiple" should read --multiply--;
Line 39, "an" should read --at--.

COLUMN 18

Line 1, "an" should read --at--.

Signed and Sealed this

Seventeenth Day of February, 1998

Attest:

BRUCE LEHMAN

Attesting Officer        Commissioner of Patents and Trademarks